US006449591B1

(12) United States Patent
Kondo et al.

(10) Patent No.: US 6,449,591 B1
(45) Date of Patent: Sep. 10, 2002

(54) LEARNING APPARATUS, LEARNING METHOD, RECOGNITION APPARATUS, RECOGNITION METHOD, AND RECORDING MEDIUM

(75) Inventors: Tetsujiro Kondo; Norifumi Yoshiwara, both of Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/584,260

(22) Filed: May 31, 2000

Related U.S. Application Data

(63) Continuation of application No. PCT/JP99/05619, filed on Oct. 12, 1999.

(30) Foreign Application Priority Data

Oct. 9, 1998 (JP) .......................................... P10-288038

(51) Int. Cl.[7] .......................... G10L 19/12; G10L 19/14; G10L 15/08
(52) U.S. Cl. ...................... 704/222; 704/211; 704/236
(58) Field of Search .............................. 704/231–245, 704/251–257, 211, 236, 222

(56) References Cited

U.S. PATENT DOCUMENTS

| | | | |
|---|---|---|---|
| 4,608,708 A | | 8/1986 | Watanabe |
| 5,502,774 A | * | 3/1996 | Bellegarde et al. .......... 704/256 |
| 5,732,393 A | | 3/1998 | Aoshima |
| 5,787,395 A | * | 7/1998 | Minamino ................... 704/255 |
| 5,893,058 A | * | 4/1999 | Kosaka ........................ 704/254 |
| 6,185,529 B1 | * | 2/2001 | Chen et al. .................. 704/251 |

FOREIGN PATENT DOCUMENTS

| | | | |
|---|---|---|---|
| EP | 0 896 319 A1 | 7/1998 | ............. G10L/3/00 |
| JP | 58-143396 | 8/1983 | ............. G10L/1/00 |
| JP | 8-211897 | 8/1996 | ............. G10L/5/06 |
| JP | 2709386 | 10/1997 | ............. G10L/7/02 |
| WO | WO98/29864 | 7/1998 | ............. G10L/3/00 |

OTHER PUBLICATIONS

"IPSG Sig Notes" [Spoken Language Processing], vol. 96, No. 74, 96–SLP–12–18, T. Miyazaki et al., "Lip–reading for Speech Recognition in Noisy Environment", pp. 97–102, issue on Jul. 27, 1996.

(List continued on next page.)

Primary Examiner—Richemond Dorvil
Assistant Examiner—Daniel Nolan
(74) Attorney, Agent, or Firm—Bell, Boyd & Lloyd LLC

(57) ABSTRACT

With respect to each of codes corresponding to code vectors in a code book stored in a code book storage section, an expectation degree storage section stores an expectation degree at which observation is expected when an integrated parameter with respect to a word as a recognition target is inputted. A vector quantization section vector-quantizes the integrated parameter and outputs a series of codes of a code vector which has a shortest distance to the integrated parameter. Further, a chi-square test section makes a chi-square test with use of the series of codes outputted from the vector quantization section and an expectation degree of each code stored in the expectation degree storage section, thereby to obtain properness as to whether or not the integrated parameter corresponds to a recognition target. Further, recognition is performed, based on the chi-square test result. As a result of this, recognition can be performed without considering time components which a signal has.

7 Claims, 24 Drawing Sheets

OTHER PUBLICATIONS

Research and Development by Oki Electric Industry Co., Ltd., vol. 64, No. 2, T. Miyazaki et al., "Auditory and Visual Approach for Speech Recognition in Noisy Environment", pp. 45–50, issue on Apr., 1997.

IEICE Technical Report (Voice), vol. 87, No. 298, SP87–92, K. Sano et al., "Examination of Word Pre–Selection Method in Consideration of Speaker Adaptation", pp. 39–44, issue on Dec. 17, 1987, especially, p. 40, left column, line 13 to right column, line 3, p. 41, left column, line 15 to right column, line 13, Fig. 2.

The Transactions of the Institute of Electronics, Information and Communication Engineers, vol. J70–D, No. 6, Jun. 1987, K. Shirai et al., "Speaker Identification Based on Frequency Distribution of Vector–Quantized Spectra", pp. 1181–1188; especially, p. 1183, lower left column, third line from the bottom to right column, line 25,; p. 1185, right column, line 9 to p. 1187, right column, line 4.

* cited by examiner

ELLIPTIC APPROXIMATION OF
LIP INFORMATION

LEARNING APPARATUS, LEARNING METHOD, RECOGNITION APPARATUS, RECOGNITION METHOD, AND RECORDING MEDIUM

This application is a continuation of international application number PCT/JP 99/05619, filed Oct. 12, 1999.

BACKGROUND OF THE INVENTION

The present invention relates to a learning apparatus and a learning method, and particularly to a learning apparatus, a learning method, a recognition apparatus, a recognition method, and a recording medium which enable recognition of a signal including a nonlinear time component, such as speech or the like, without considering the time component.

Also, the present invention relates particularly to a learning apparatus, a learning method, a recognition apparatus, a recognition method, and a recording medium which are capable of improving a recognition rate by providing models capable of sufficiently expressing, for example, a transition of a state or the like.

Further, the present invention relates to a learning apparatus, a learning method, a recognition apparatus, a recognition method, and a recording medium which are capable of dealing with parameters concerning speech and images by using equal weights, for example, where speech recognition is carried out based on a speech and an image of lips when the speech is pronounced.

For example, with respect to speech, the length of a word nonlinearly extends or contracts every time, even if one person pronounces the same word twice. Therefore, when recognizing pronunciation, it is necessary to cope with such nonlinear extension or contraction of length. For example, a DP (Dynamic Programming) matching method is known as a method in which matching to a standard pattern is carried out while DTW (Dynamic Time Warping) is performed by performing nonlinear time-axis extension or contraction.

However, even if the time-axis extension or contraction is carried out by the DP matching method, there is no guarantee that phonemes of an inputted speech properly correspond to phonemes of a standard pattern. If the phonemes do not correspond properly, a recognition error occurs.

Meanwhile, if matching can be performed without considering nonlinear time components of speech, recognition errors due to time-axis extension or contraction as described above can be prevented.

Also, as an algorithm for recognizing speech, a HMM (Hidden Markov Models) method has been conventionally known. In a discrete HMM method, learning is previously carried out so that models corresponding to recognition targets are obtained. From each model, a probability (observation probability) at which an input series corresponding to an inputted speech is observed is calculated on the basis of a state transition probability given to the model (at which a state transits to another state which normally includes transition to itself) and an output probability (at which a certain code (label or symbol) is outputted when transition of a state occurs). Further, based on the observation provability, the inputted speech is recognized.

Meanwhile, with respect to learning in the HMM method, a manufacturer of a system determines the number of states and forms of state transitions (e.g., a limitation to state transition by which the transition from a state to another state is limited to either itself or a right adjacent state), and models thereof are used to carry out the learning.

However, the models which are, as it were, determined by the system manufacturer do not always comply with the number of states or forms of state transition which recognition targets originally have. Further, if the models do not comply with the number of states or forms of state transition which observation targets originally have, several models cannot correctly express steady states or transiting states, and as a result, the recognition rate is deteriorated.

Further, for example, recognition of a speech is achieved by extracting a characteristic parameter from the speech and comparing the characteristic parameter with a standard parameter (standard pattern) as a reference.

Meanwhile, if recognition of a speech is carried out based only on the speech, improvement of the recognition rate is limited to some extent. Hence, it is possible to consider a method in which the recognition rate is improved by using an image obtained by picking up lips of a speaker who is speaking, in addition to the speech itself.

In this case, a characteristic parameter extracted from the speech and a characteristic parameter extracted from the image of lips are integrated (combined) with each other, into an integrated parameter. It is considered that this integrated parameter can be used to carry out recognition of the speech.

However, if a characteristic parameter of a speech and a characteristic parameter of an image are simply integrated in parallel (or simply joined with each other) to achieve recognition, the recognition is influenced strongly from either the speech or image (i.e., one of the speech and the image may be weighted more than the other), thereby hindering improvement of the recognition rate.

SUMMARY OF THE INVENTION

An advantage of the present invention is, therefore, to achieve improvements of the recognition rate by enabling recognition without considering a time component of a signal.

Another advantage of the present invention is to achieve improvements of the recognition rate of speech and the like by providing a model which can sufficiently express the number of states and the like which a recognition target originally has.

A further advantage of the present invention is to achieve improvements of the recognition performance by making it possible to deal with characteristic parameters of different inputs such as a speech and an image, with equal weights.

To this end, a learning apparatus according to an embodiment of the present invention is provided. The learning apparatus includes calculation means for calculating an expectation degree of each identifier, from a series of identifiers indicating code vectors, obtained from a time series of learning data.

A learning method according to an embodiment of the present invention calculates an expectation degree of each identifier, from a series of identifiers indicating code vectors, obtained from a time series of learning data.

A recording medium according to an embodiment of the present invention records a program having a calculation step of calculating an expectation degree of each identifier, from a series of identifiers indicating code vectors, obtained from a time series of learning data.

A recognition apparatus according to the present invention includes vector quantization means for vector-quantizing input data and for outputting a series of identifiers indicating code vectors. Properness detection means are provided for obtaining properness as to whether or not the input data corresponds to the recognition target, with use of the series of identifiers obtained from the input data and expectation degrees of identifiers. Recognition means are provided for recognizing whether or not the input data corresponds to the recognition target, based on the properness.

A recognition method according to the present invention is characterized in that: input data is vector-quantized, thereby to output a series of identifiers indicating code vectors; properness as to whether or not the input data corresponds to a recognition target is obtained with use of the series of identifiers obtained from the input data and expectation degrees of the identifiers at which the identifiers are expected to be observed; and whether or not the input data corresponds to the recognition target is recognized, based on the properness.

A recording medium according to the present invention is characterized by recording a program including: a vector-quantization step of vector-quantizing the time series of input data pieces, thereby to output a series of identifiers indicating code vectors; a properness detection step of obtaining properness as to whether or not the time series of input data pieces corresponds to the recognition target, with use of the series of identifiers obtained from the input data and expectation degrees of the identifiers at which the identifiers are expected to be observed; and a recognition step of recognizing whether or not the time series of input data pieces corresponds to the recognition target, based on the properness.

It should be appreciated that the term "properness" as used throughout the text means the same as and/or is interchangeable with the term "measure of correctness" or other like term or terms.

In a learning apparatus, a learning method, and a recording medium according to the present invention, an expectation degree is calculated from a series of identifiers obtained from a time series of learning data pieces.

In a recognition apparatus, a recognition method, and a recording medium according to the present invention, input data is vector-quantized thereby to output a series of identifiers indicating code vectors, and properness as to whether or not the input data corresponds to a recognition target is obtained with use of the series of identifiers obtained from the input data and expectation degrees of the identifiers at which the identifiers are expected to be observed. Further, whether or not the input data corresponds to the recognition target is recognized, based on the properness.

A learning apparatus according to the present invention includes distance calculation means for calculating a distance between a standard series and a code vector and for outputting transition of the distance.

A learning method according to the present invention includes calculating a distance between a standard series and a code vector and outputting transition of the distance.

A recording medium according to the present invention records a program including a distance calculation step of calculating a distance between a standard series and a code vector and of outputting transition of the distance.

A recognition apparatus according to the present invention includes: storage means which store a distance transition model corresponding to at least one recognition target and expressing transition of a distance between a standard series and each code vector of a code book; vector quantization means for vector-quantizing a time series of input data, with use of the code book and for outputting a series of identifiers corresponding to the code vectors; and recognition means for recognizing whether or not the input data corresponds to at least one recognition target, based on the distance transition model and the series of identifiers with respect to the input data.

A recognition method according to the present invention is characterized in that a time series of input data is vector-quantized with use of a code book thereby to output a series of identifiers corresponding to code vectors, and whether or not the input data corresponds to at least one recognition target is recognized, based on a distance transition model expressing transition of a distance between a standard series and a code vector and corresponding to at least one recognition target and a series of identifiers with respect to the input data.

A recording medium according to the present invention records a program including: a vector quantization step of vector-quantizing a time series of input data with use of a code book and of outputting a series of identifiers corresponding to code vectors; and a recognition step of recognizing whether or not the input data corresponds to at least one recognition target, based on a distance transition model expressing transition of a distance between a standard series and a code vector and corresponding to at least one recognition target and a series of identifiers with respect to the input data.

A recognition apparatus according to the present invention includes: integration means for integrating a time series of first input data and a time series of second input data, thereby to output a time series of integrated data; and recognition means for recognizing whether or not the time series of first or second input data corresponds to at least one recognition target, based on transition of a distance obtained from a vector based on the time series of integrated data.

A recognition method according to the present invention is characterized in that a time series of first input data and a time series of second input data are integrated thereby to output a time series of integrated data, and whether or not the time series of first or second input data corresponds to at least one recognition target, based on transition of a distance obtained from a vector based on the time series of integrated data.

A recording medium according to the present invention records a program including: an integration step of integrating a time series of first input data and a time series of second input data, thereby to output a time series of integrated data; and a recognition step of recognizing whether or not the time series of first or second input data corresponds to at least one recognition target, based on transition of a distance obtained from a vector based on the time series of integrated data.

In a learning apparatus, a learning method, and a recording medium according to the present invention, a distance between a standard parameter and a code vector is calculated and transition of the distance is outputted.

In a recognition apparatus, a recognition method, and a recording medium according to the present invention, a time series of input data is vector quantized with use of a code book, and a series of identifiers corresponding to code vectors is outputted. Further, whether or not the input data corresponds to at least one recognition target is recognized, based on a distance transition model expressing a distance between a standard series and a code vector and corresponding at least one recognition target and a series of identifiers with respect to the input data.

In a recognition apparatus, a recognition method, and a recording medium according to the present invention, a time series of first data and a time series of second data are integrated and a time series of integrated data is outputted. Further, whether or not the first or second data corresponds to at least one recognition target, based on transition of a distance obtained from a vector based on the time series of integrated data.

A learning apparatus according to the present invention includes: characteristic parameter normalization means for normalizing each of a plurality of characteristic parameters, based on a normalization coefficient; distance calculation means for calculating a distance to a standard parameter, with respect to each of the plurality of characteristic parameters normalized; and change means for changing the normalization coefficient such that a distance with respect to an arbitrary one of the plurality of characteristic parameters and a distance with respect to another arbitrary one of the plurality of characteristic parameters are equal to each other.

A learning method according to the present invention is characterized in that: each of a plurality of characteristic parameters is normalized, based on a normalization coefficient; a distance to a standard parameter is calculated with respect to each of the plurality of characteristic parameters normalized; and the normalization coefficient is changed such that a distance with respect to an arbitrary one of the plurality of characteristic parameters and a distance with respect to another arbitrary one of the plurality of characteristic parameters are equal to each other.

A recording medium according to the present invention records a program including: a characteristic parameter normalization step of normalizing each of a plurality of characteristic parameters, based on a normalization coefficient; a distance calculation step of calculating a distance to a standard parameter, with respect to each of the plurality of characteristic parameters normalized; and a change step of changing the normalization coefficient such that a distance with respect to an arbitrary one of the plurality of characteristic parameters and a distance with respect to another arbitrary one of the plurality of characteristic parameters are equal to each other.

A recognition apparatus according to the present invention includes: normalization means for normalizing a characteristic parameter of each of a plurality of input data pieces; integration means for integrating a plurality of normalized characteristic parameters into an integrated parameter; and recognition means for recognizing whether or not one or more of the plurality of input data pieces correspond to a recognition target, based on the integrated parameter.

A recognition method according to the present invention is characterized in that: a characteristic parameter of each of a plurality of input data pieces is normalized; a plurality of normalized characteristic parameters are integrated into an integrated parameter; and whether or not one or more of the plurality of input data pieces correspond to a recognition target is recognized, based on the integrated parameter.

A recording medium according to the present invention is characterized records a program including: a detection step of detecting a characteristic parameter with respect to each of a plurality of input data pieces; a normalization step of normalizing a characteristic parameter of each of a plurality of input data pieces; an integration step of integrating a plurality of normalized characteristic parameters into an integrated parameter; and a recognition step of recognizing whether or not one or more of the plurality of input data pieces correspond to a recognition target, based on the integrated parameter.

In a learning apparatus, a learning method, and a recording medium according to the present invention, each of a plurality of characteristic parameters is normalized, based on a normalization coefficient, and a distance to a standard parameter is calculated with respect to each of the plurality of characteristic parameters normalized. Further, the normalization coefficient is changed such that a distance with respect to an arbitrary one of the plurality of characteristic parameters and a distance with respect to another arbitrary one of the plurality of characteristic parameters are equal to each other.

In a recognition apparatus, recognition method, and a recording medium according to the present invention, a characteristic parameter of each of a plurality of input data pieces is normalized, and a plurality of normalized characteristic parameters are integrated into an integrated parameter. Further, whether or not one or more of the plurality of input data pieces correspond to a recognition target is recognized, based on the integrated parameter.

Additional features and advantages of the present invention are described in, and will be apparent from, the following Detailed Description of the Invention and the Figures.

DETAILED DESCRIPTION OF THE INVENTION

Figure 1:
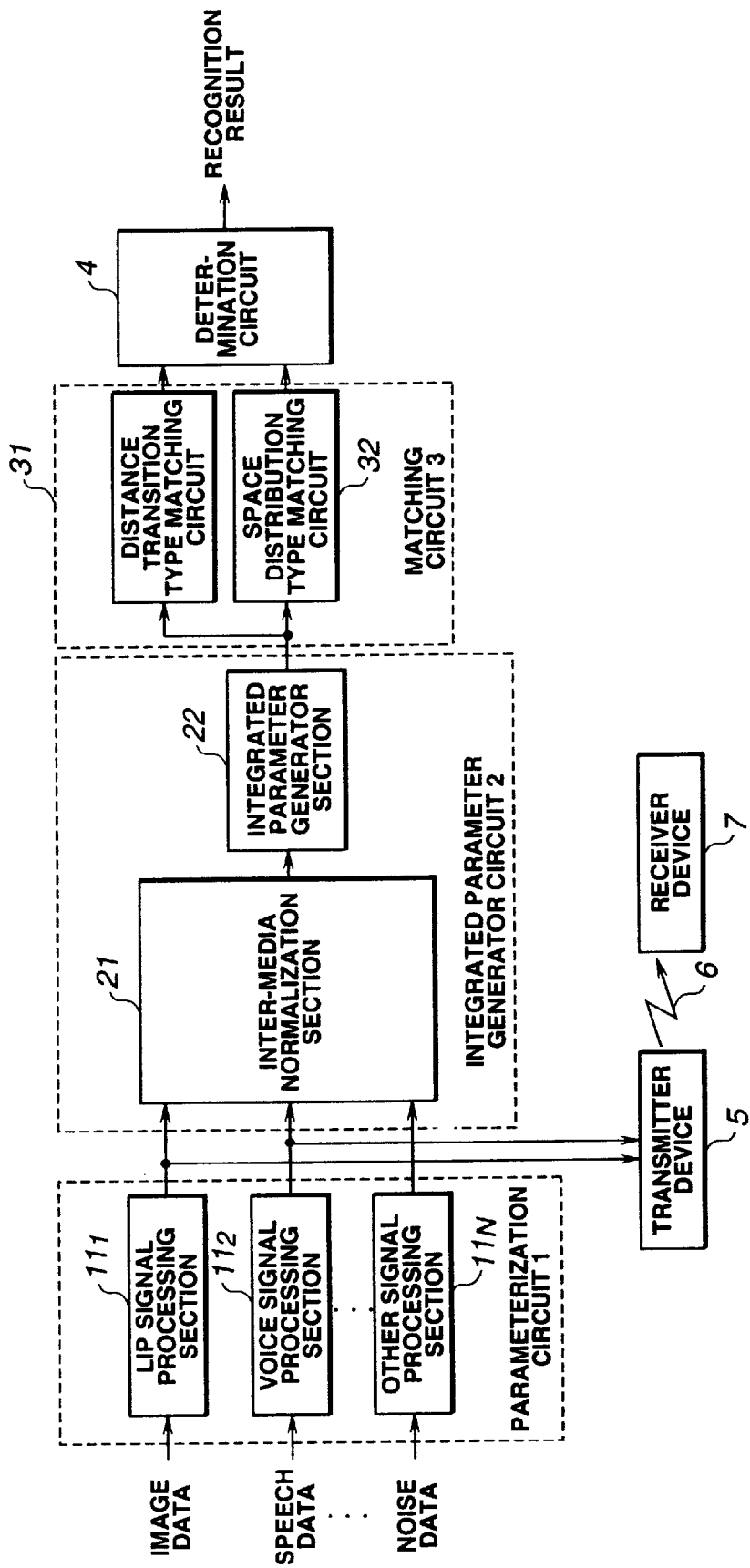
FIG. 1 is a block diagram showing a structural example of an embodiment of a speech recognition apparatus to which the present invention is applied.

FIG. 1 shows a structural example of an embodiment of a speech recognition apparatus to which the present invention is applied. In this speech recognition apparatus, data (image data) of an image obtained by picking up lips of a speaking user, data (noise data) of noise in the circumstance where the user is speaking, and other data helpful for recognition of a speech of the user (e.g., a signal corresponding to an operation on a button for inputting a place where the user is speaking when the button is operated if the apparatus is provided with the button, an output from a temperature sensor for measuring a temperature of the circumstance where speech recognition is carried out, and the like) can be inputted sequentially in time series, in addition to speech data obtained by collecting speech spoken by a user with a microphone. Based on these data pieces, recognition of speech data is carried out.

That is, a parameterization circuit 1 is inputted with the speech data, image data of lips, noise data, and other data described above (each of which is digital data). Further, the parameterization circuit 1 has signal processing sections $11_1$ to $11^N$ for processing each of various data items inputted thereto, and processes the speech data, image data of lips, noise data, and other data by the corresponding signal processing sections $11_n$ (n=1, 2, ..., N: N is the maximum number of types of signals which can be inputted to the parameterization circuit 1), thereby to extract respectively characteristic parameters which express the data items, or so. The characteristic parameters extracted by the parameterization circuit 1 are supplied to an integrated parameter generator circuit 2.

In the embodiment shown in FIG. 1, each of the signal processing sections $11_1$, $11_2$, and $11_N$ processes image data of lips, speech data, or noise data. Characteristic parameters of speech (acoustic) data such as speech data, noise data, and the like are, for example, a linear estimation coefficient, Cepstrum coefficient, power, Line Spectrum Pair, zero cross, and the like. Also, the characteristic parameters of the image data of the lips will be described later.

The integrated parameter generator circuit 2 is constructed by an inter-media normalization section 21 and an integrated parameter generator section 22 and serves to generate an integrated parameter which integrates characteristic parameters of various types of signals from the parameterization circuit 1.

That is, the inter-media normalization section 21 normalizes the characteristic parameters of various types of signals from the parameterization circuit 1 so that these parameters can be dealt with by equal weighting (scale), and outputs the parameters to the integrated parameter generator section 22. The integrated parameter generator section 22 integrates (combines) the normalized characteristic parameters of various types of signals, supplied from the inter-media normalization section 21, thereby to generate an integrated parameter, and outputs the integrated parameter to a matching circuit 3.

The matching circuit 3 performs matching between an integrated parameter and a standard pattern (a model of a recognition target), and outputs the matching result to a determination circuit 4. The matching circuit 3 includes a distance transition type matching section 31 and a space distribution type matching section 32. The distance transition type matching section 31 uses a distance transition model described later to perform matching of an integrated parameter according to a distance transition system also described later, and outputs the matching result to a determination circuit 4.

The determination circuit 4 recognizes the output of the matching circuit 3, i.e., recognizes speech of the user, based on the matching result in the transition type matching section 31 and the space distribution type matching section 32, and outputs, for example, a word as a recognition result thereof.

Figure 2:
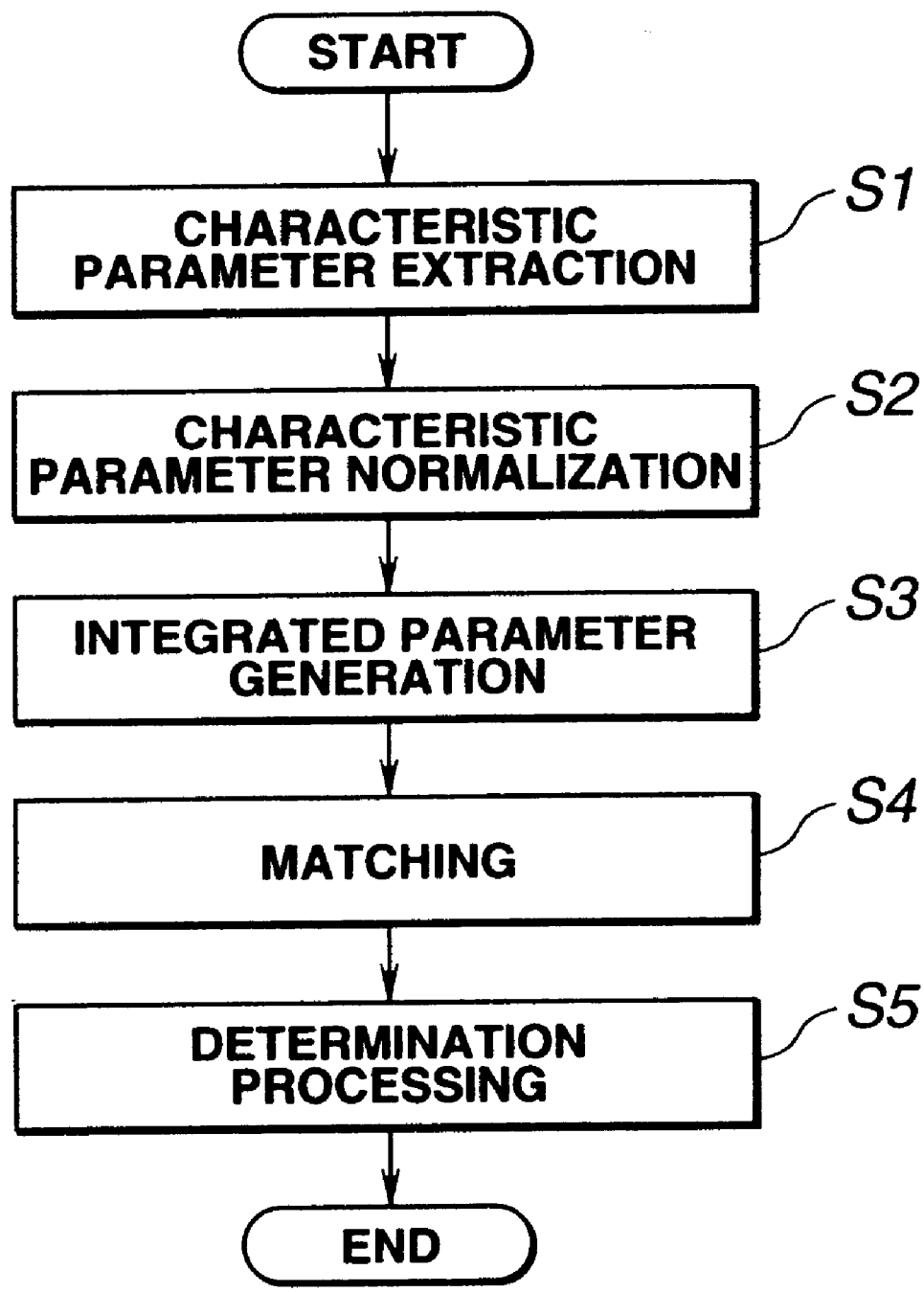
FIG. 2 is a flowchart for explaining processing in the speech recognition apparatus shown in FIG. 1.

Next, with reference to a flowchart shown in FIG. 2, processing in the speech recognition apparatus shown in FIG. 1 will be explained. In the speech recognition apparatus, speech data, image data of lips, noise data, and the like are inputted, and these data pieces are supplied to the parameterization circuit. To the parameterization circuit 1, image data obtained by picking up a gesture of a speaker, image data obtained by picking up motion of the throat (muscle) of the speaker (or an output of a sensor which measures motion of the throat), and the like can be inputted along with or in place of image data of lips.

In a step S1, the parameterization circuit 1 processes speech data, image data of lips, noise data, and the like, and extracts a characteristic parameter from each data. The characteristic parameter of each data is supplied to the integrated parameter generator circuit 2.

In a step S2, the inter-media normalization section 21 of the integrated parameter generator circuit 2 normalizes the characteristic parameter of each data from the parameterization circuit 1, and supplies the normalized parameters to the integrated parameter generator section 22. In a step S3, the integrated parameter generator section 22, the normalized characteristic parameters of the data pieces are integrated into an integrated parameter. This integrated parameter is supplied to the distance transition type matching section 31 and the space distribution type matching section 32, and the processing flow goes to a step S4.

In the step S4, the distance transition type matching section 31 performs matching of the integrated parameter from the integrated parameter generator circuit 2, according to the distance transition system. Further, in the step S4, the space distribution type matching section 32 performs matching of the integrated parameter from the integrated parameter generator circuit 2, according to the space distribution system. The matching results from the distance transition type matching section 31 and the space distribution type matching section 32 are supplied to the determination circuit 4. In a step S5, the determination circuit 4 recognizes the speech data, based on the matching results from the matching circuit 3 and outputs the recognition result (speech recognition result). The processing is then ended.

Figure 3:
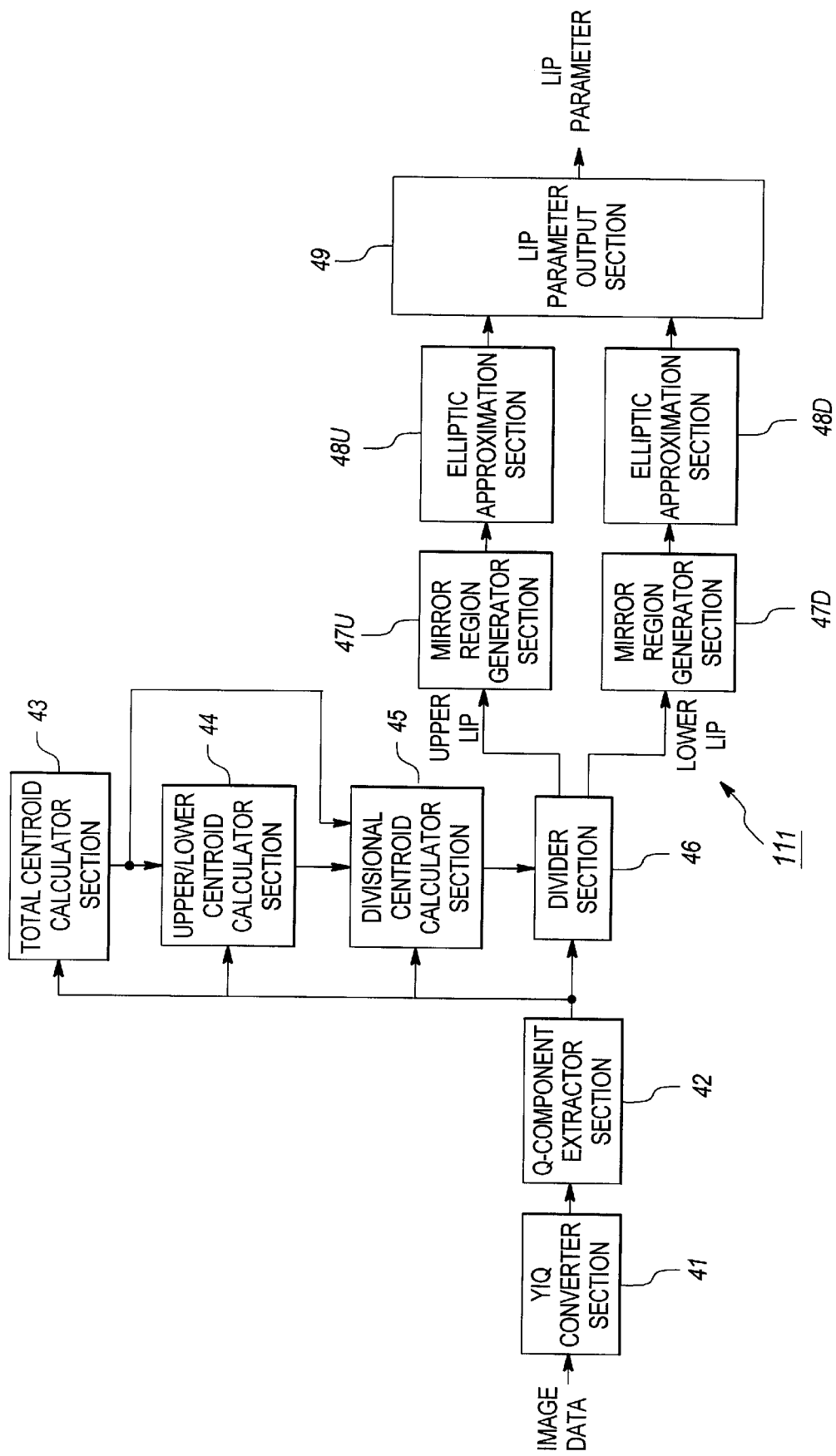
FIG. 3 is a block diagram showing a structural example of an embodiment of a signal processing section 11, shown in FIG. 1.

Next, the signal processing section $11_1$ of the parameterization circuit 1 processes the image data of lips, as described above, and extracts a characteristic parameter thereof. FIG. 3 shows a structural example of the signal processing section $11_1$.

The image data of lips is supplied to a YIQ converter section 41, and the YIQ converter section 41 converts the image data of lips into a signal expressed by YIQ. That is, image data of lips inputted to the signal processing section $11_1$ is expressed by RGB (Red, Green, and Blue), for example. The YIQ converter section 41 converts such image data of lips expressed by RGB into data expressed by YIQ and supplies the data to a Q-component extractor section 42.

The Q-component extractor section 42 extracts pixels whose Q-components have signal levels equal to or higher than a threshold value, and outputs the pixels, as pixels forming lips (which will be hereinafter called lip pixels), to a total centroid calculator section 43, an upper/lower centroid calculator section 44, a divisional centroid calculator section 45, and a divider section 46.

The total centroid calculator section 43 obtains a centroid of the entire lip pixels (hereinafter called a total centroid) from the Q-component extractor section 42, and supplies the total centroid to the upper/lower centroid calculator section 44 and the divisional centroid calculator section 45.

The upper/lower centroid calculator section 44 obtains upper and lower centroids described later. That is, based on the total centroid from the total centroid calculator section 43, the upper/lower centroid calculator section 44 divides temporarily the lip pixels into pixels forming the upper lip (hereinafter called upper lip pixels) and pixels forming the lower lip (hereinafter called lower lip pixels). Further, the upper/lower centroid calculator section 44 obtains a centroid of the entire upper lip pixels (hereinafter called an upper centroid) and a centroid of the entire lower lip pixels (hereinafter called a lower centroid), and outputs the upper and lower centroids to the divisional centroid calculator section 45.

The divisional centroid calculator section 45 obtains a point which is a reference for finally dividing the lip pixels into the upper and lower lip pixels, based on the total centroid from the total centroid calculator section 43 and the upper and lower centroids from the upper/lower centroid calculator section 44, and outputs the point to the division section 46.

The division section 46 divides the lip pixels from the Q-component extractor section 42, into upper and lower lip pixels, and outputs the upper lip pixels and the lower lip pixels to a mirror region generator section 47U and a mirror region generator section 47D, respectively.

The mirror region generator section 47U forms a mirror region described later, with respect to the upper lip pixels, and supplies the mirror region together with the upper lip pixels, to an elliptic approximation section 48U. The mirror region generator section 47D forms a mirror region, with respect to the lower lip pixels, and supplies the mirror region together with the lower lip pixels, to an elliptic approximation section 48D.

The elliptic approximation section 48U obtains an ellipse which approximates the upper lip pixels and the mirror region thereof from the mirror region generator section 47U to each other, and supplies a parameter (elliptic parameter) which defines the ellipse, a lip parameter output section 49. The elliptic approximation section 48D obtains an ellipse which approximates the lower lip pixels and the mirror region thereof from the mirror region generator section 47D, and supplies an elliptic parameter which defines the ellipse, to a lip parameter output section 49.

The lip parameter output section 49 deletes repeated elliptic parameters among the elliptic parameters from the elliptic approximation sections 48U and 48D, and remaining parameters are outputted as lip parameters as characteristic parameters expressing the characteristic of the lips.

Next, with reference to the flowchart shown in FIG. 4, processing in the signal processing section $11_1$ in FIG. 3 will be explained. Upon receipt of image data of lips expressed by RGB, for example, the YIQ converter section 41 uses a YIQ conversion matrix in a step S11, converts the image data into data expressed by YIQ, and supplies the data to the Q-component extractor section 42.

The Q-component extractor section 42 extracts pixels in a step S12 whose Q-components are higher than a threshold value, from the image data of lips expressed by YIQ from YIQ converter section 41, and outputs the pixels as lip pixels to the total centroid calculator section 43, upper/lower centroid calculator section 44, divisional centroid calculator section 45, and division section 46.

According to research made by the present inventor, it has been found that pixels forming lips (lip pixels) have relatively large Q-components and can therefore be extracted with relatively high precision by extracting pixels which have relatively large Q-components. Although the Q-component are is a red-based color component, it has been also found from research made by the present inventor that lip pixels can be extracted with relatively higher precision by extracting pixels having large Q-components than by extracting pixels having large R-components which are also red-based color components.

Figure 5:
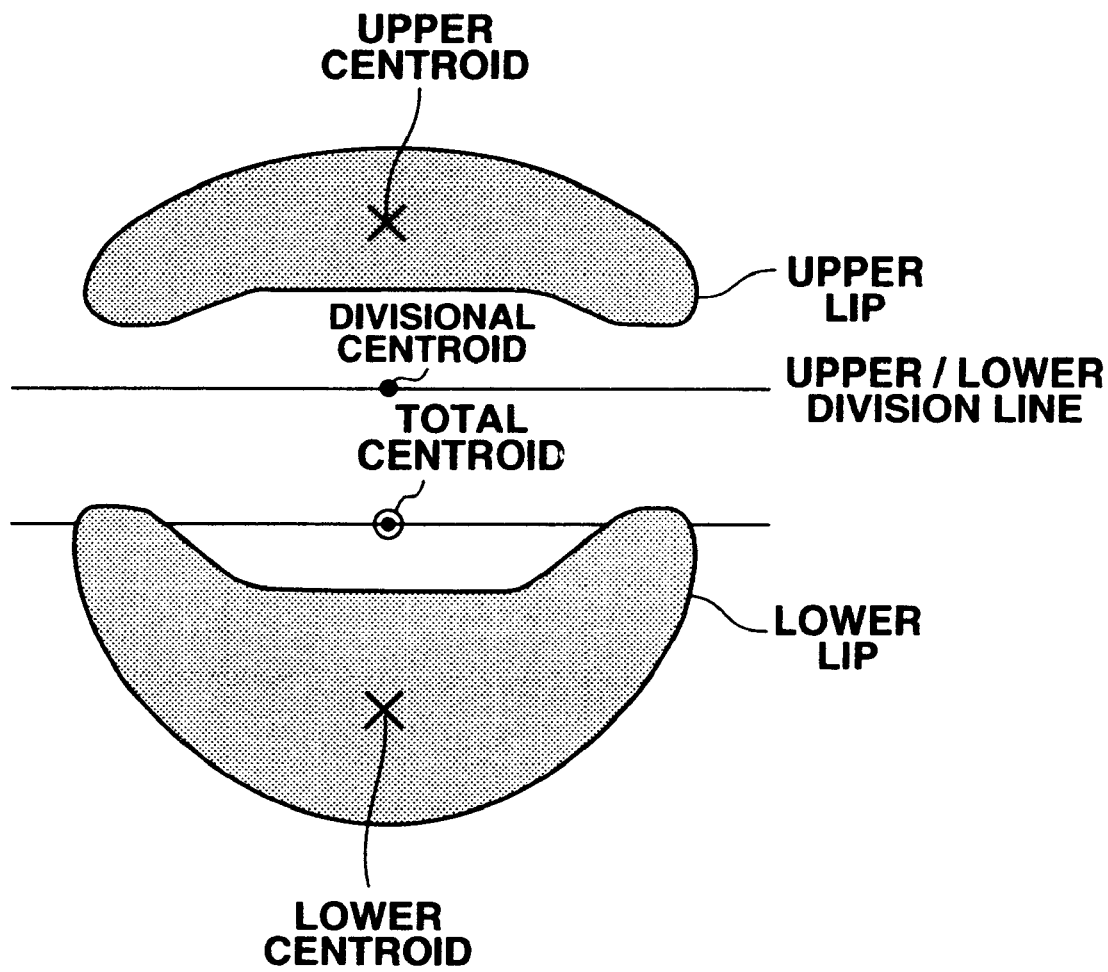
FIG. 5 is a view showing total, upper, lower, and divisional centroids.

Upon receipt of lip pixels from the Q-component extractor section 42, the total centroid calculator section 43 obtains a centroid (total centroid) of the entire lip pixels, as indicated by ⊙ in FIG. 5, in a step S13, and supplies the total centroid to the upper/lower centroid calculator section 44 and the divisional centroid calculator section 45. The processing goes to a step S14. In the step S14, upper and lower centroids are calculated in the upper/lower centroid calculator section 44.

That is, the upper/lower centroid calculator section 44 temporarily divides the lip pixels from the Q-component extractor section 42 into upper and lower two sides by a line passing through the total centroid in the horizontal direction, as shown in FIG. 5. In the present embodiment, it is supposed that data obtained by picking up a speaking user from the front side is provided as image data of lips.

Further, the upper/lower centroid calculator section 44 obtains upper and lower centroids, as indicated by × in FIG. 5, with the pixels in the upper and lower sides taken as the pixels forming the upper and lower lips, respectively. These upper and lower centroids are supplied to the divisional centroid calculator section 45.

The divisional centroid calculator section 45 obtains a divisional centroid in a step S15. That is, the divisional centroid calculator section 45 divides the lip pixels from the Q-component extractor section 42 into upper and lower sides by a line passing through the total centroid in the horizontal direction, like the case of the upper/lower centroid calculator section 44, and counts the number of pixels in each side. Further, the divisional centroid calculator section 45 internally divides a segment passing through the upper and lower centroids, at a ratio between the numbers of the upper and lower lip pixels, and the internal division point is taken as a divisional centroid. This divisional centroid is supplied to the division section 46.

In a step S 16, the divisional centroid calculator section 46 divides lip pixels from the Q-component extractor section 42 into upper and lower two sides by a line passing through the divisional centroid in the horizontal direction, as indicated by the mark • in FIG. 5 from the divisional centroid calculator section 45, thus dividing into final upper lip pixels and lower lip pixels. The section 46 outputs the upper and lower lip pixels to the mirror region generator sections 47U and 47D.

Figure 6A:
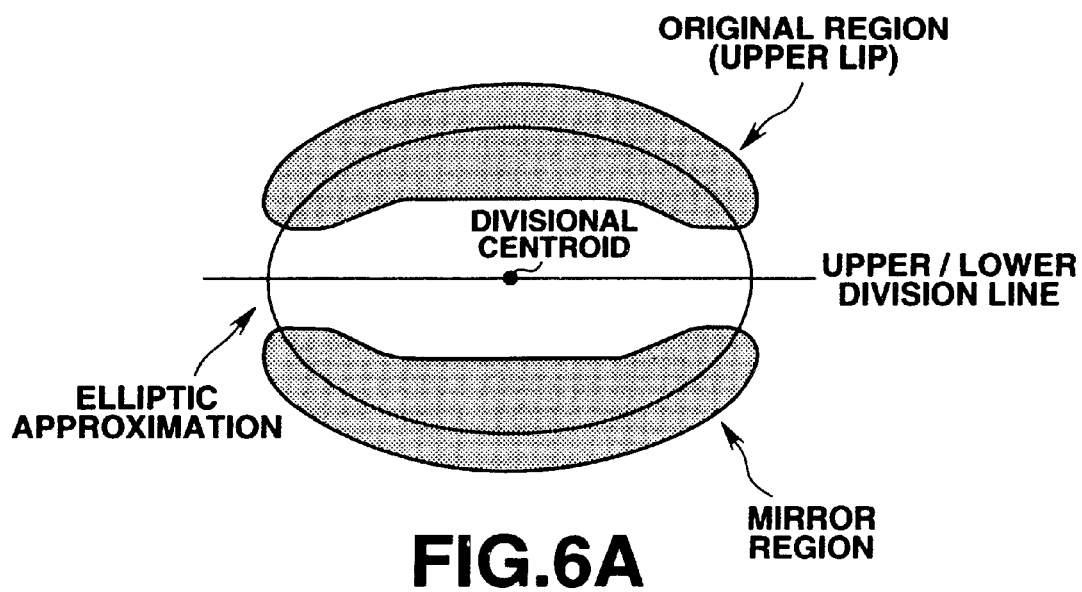
FIGS. 6A and 6B are views for explaining processing in elliptic approximation sections 48U and 48D shown in FIG. 3.

Further, in a step S17, the mirror region generator section 47U forms a mirror region with respect to the upper lip pixels, and the mirror region generator section 47D forms a mirror region with respect to the lower lip pixels. That is, with respect to the upper lip pixels, the mirror region generator section 47U generates a region which is line-symmetrical to a line (hereinafter called an upper/lower division line), as a mirror region thereof, as shown in FIG. 6A, and supplies the mirror region together with the upper lip pixels to the elliptic approximation section 48U. Also, with respect to the lower lip pixels, the mirror region generator section 47D generates a region which is line-symmetrical to the upper/lower division line, as a mirror region thereof, and supplies the mirror region together with the lower lip pixels, to the elliptic approximation section 48D.

Figure 6B:
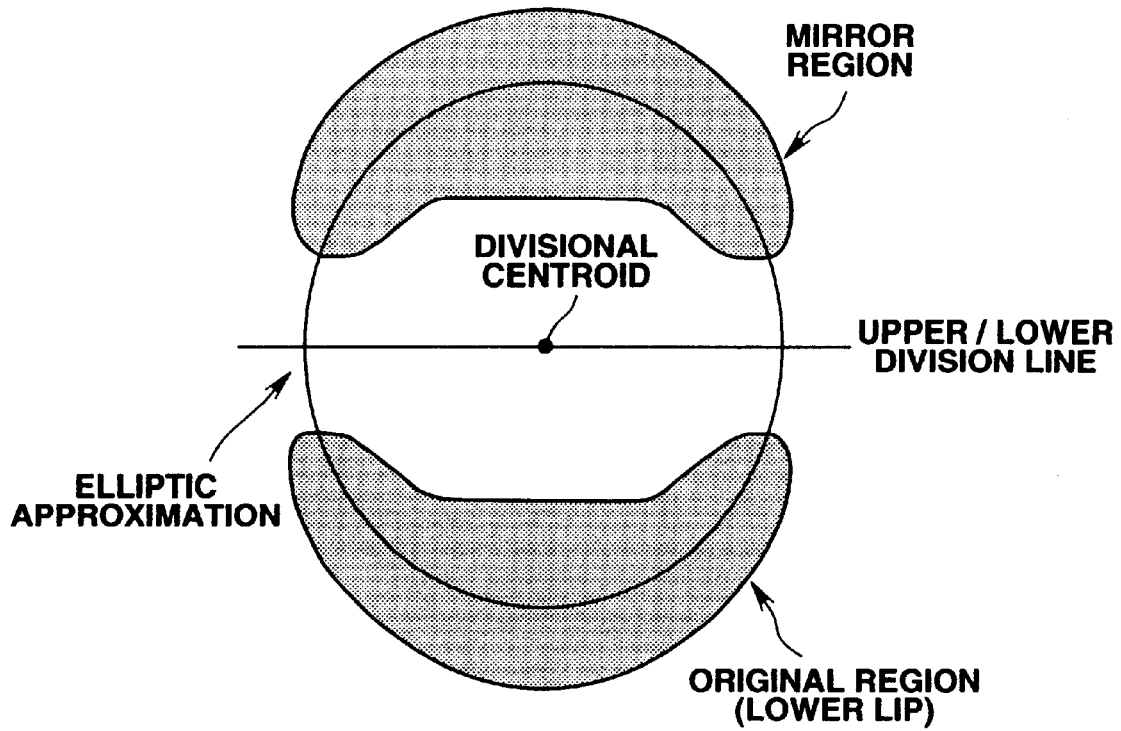

Thereafter, in a step S18 the elliptic approximation section 48U obtains an ellipse, which approximates the upper lip pixels and the mirror region thereof to each other as shown in FIG. 6A and is centered on the divisional centroid, for example, by a least square method. The elliptic approximation section 48D also obtains an ellipse, which approximates the lower lip pixels and the mirror region thereof to each other as shown in FIG. 6B and is centered on the divisional centroid, for example, by a least square method.

That is, where x and y coordinates of a divisional centroid are expressed as $x_0$ and $y_0$, an ellipse whose lateral radius (radius in the x-axis direction (horizontal direction)) and longitudinal radius (radius in the y-axis direction (vertical direction)) are respectively $1/a^{1/2}$ and $1/b^{1/2}$ can be expressed by the following formula.

$$a(x-x_0)^2 + b(y-y_0)^2 = 1 \quad (1)$$

Therefore, an ellipse which minimizes a square error which approximates the upper lip pixels and the pixel forming the mirror region thereof can be obtained by solving the following formula.

$$\begin{bmatrix} \sum (x-x_0)^4 & \sum (x-x_0)^2(y-y_0)^2 \\ \sum (x-x_0)^2(y-y_0)^2 & \sum (y-y_0)^4 \end{bmatrix} \begin{bmatrix} a \\ b \end{bmatrix} = \begin{bmatrix} \sum (x-x_0)^2 \\ \sum (y-y_0)^4 \end{bmatrix} \quad (2)$$

In the formula (2), $\Sigma$ represents a summation of all the upper pixels and the pixels forming the mirror region thereof.

The elliptic approximation section 48U solves the formula (2) thereby to obtain the lateral and longitudinal radiuses of the ellipse which approximates the upper lip pixels and the mirror region thereof and is centered on the divisional centroid, and supplies the lateral and longitudinal radiuses as ellipse parameters which approximate the upper lip, to a lip parameter output section 49. The elliptic approximation section 48D obtains the lateral and longitudinal radiuses of the ellipse which approximates the lip pixels and the mirror region thereof, like the case of the elliptic approximation section 48U, and supplies the radiuses to the lip parameter output section 49.

Figure 7:
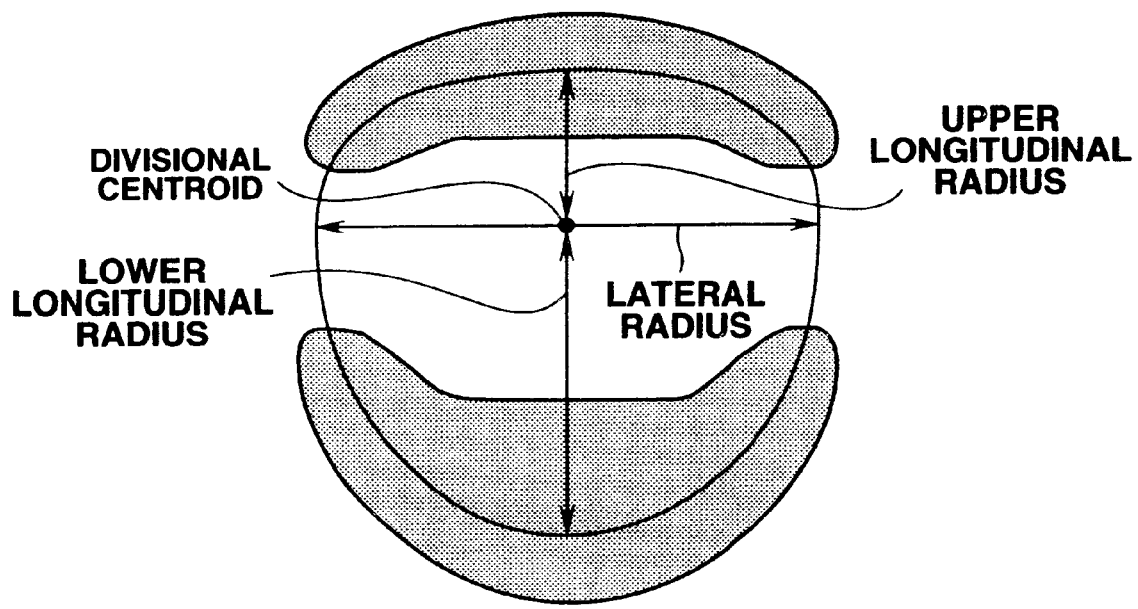
FIG. 7 is a view for explaining characteristic parameters of lips outputted from a lip parameter output section 49 shown in FIG. 3.

The lip parameter output section 49 deletes duplicated parameters from the ellipse parameters from the elliptic approximation sections 48U and 48D, in a step S19. That is, the lateral radius of the ellipse which approximates the upper lip pixels and the mirror region thereof should ideally be equal to the lateral radius of the ellipse which approximates the lower lip pixels and the mirror region thereof, as shown in FIG. 7. The lip parameter output section 49 deletes one of the equal lateral radiuses, and three ellipse parameters, that is, the remaining lateral radius, the longitudinal radius of the ellipse which approximates the upper lip pixels and the mirror region thereof (hereinafter called an upper longitudinal radius), and the longitudinal radius of the ellipse which approximates the lower lip pixels and the mirror region thereof (hereinafter called a lower longitudinal radius), as characteristic parameters of lips. The processing is then ended.

The signal processing section $11_1$ repeats the processing described above, for example, every time when image data of lips for one frame is supplied.

The lateral radius of the ellipse which approximates the upper lip pixels and the mirror region thereof to each other should be ideally equal to the lateral radius of the ellipse which approximates the lower lip pixels and the mirror region thereof. However, when obtaining the ellipses by the least square method, the lateral radiuses are not equal to each other although the difference between the two is very slight. Therefore, with respect only to the later radiuses, data is accessed between the elliptic approximation section 48U and 48D, as indicated by a broken line shown in FIG. 3, to obtain a sum of a square error of the ellipse which approximates the upper lip and a square error of the ellipse which approximates the lower lip, and a lateral radius of an ellipse which minimizes the sum can be obtained.

In addition, the two lateral radiuses can be, as it were, summed up by obtaining independently the lateral radius of the ellipse which approximates the upper lip pixels and the mirror region and the lateral radius of the ellipse which approximates the lower lip pixels and the mirror region thereof by the least square method and by thereafter selecting one of these lateral radiuses or calculating an average value of these lateral radiuses. However, if one of the lateral radiuses of the ellipses which approximate the upper and lower lips is selected, precision of approximation based on the ellipse which is not selected is deteriorated. Otherwise, if an average of the two lateral radiuses is calculated, the ellipse whose lateral radius is the average value does not always approximate the upper and lower lips with high precision. Therefore, in order to maintain high precision of approximation of the upper and lower lips based on the ellipses to some extent, desirably, the sum of the square errors of the ellipses which approximate the upper and lower lips should be obtained, and the lateral radius of an ellipse which minimizes the sum should be obtained, as described above.

As described above, the lip pixels are divided into upper and lower lip pixels, and ellipses which approximate the upper and lower lip pixels are obtained. Lateral radiuses and longitudinal radiuses expressing the ellipses are used as characteristic parameters which expresses the characteristics of the lips. Therefore, according to the characteristic parameters, motion or the like of the lips can be reproduced with fidelity.

Further, since ellipses are approximated to lips, it is possible to obtain characteristic parameters which are robust against noise even if image data of the lips include more or less noise.

Further, the characteristic parameters as a lateral radius and upper and lower longitudinal radiuses of ellipse which approximate the lips are linked with motion of the lips which is visually obtained where a person observes his or her lips or lips of another person. Therefore, in case where the characteristic parameters are verified, the verification efficiency can be improved.

In addition, since only three characteristic parameters of a lateral radius, and upper and lower longitudinal radiuses are needed, it is possible to express efficiently lips by a smaller number of characteristic parameters, for example, compared with a case where four of upper, lower, left, and right end points of lips are used as characteristic parameters.

As a result of this, the data amount of characteristic parameters of lips transmitted from the transmitter device 5 to the receiver device 7 can be small, for example, as shown in FIG. 1, in case where the characteristic parameters outputted by the signal processing section $11_1$ and the speech data outputted by the signal processing section $11_2$ are transmitted from the transmitter device 5 through a transmission medium 6 such as a telephone line, CATV (Cable Television), Internet, a satellite line, or the like to a receiver device 7, and speech is reproduced based on the characteristic parameters of speech data while an image of a face of a person is moved based on the characteristic parameters of the lips, in the receiver device 7.

Further, in the embodiment shown in FIG. 3, a centroid (total centroid) of the entire lip pixels is obtained, and lip pixels are temporarily divided into upper and lower lip pixels, based on the total centroid. Upper and lower centroids are obtained. Further, a divisional centroid is obtained, and lip pixels are divided into final upper and lower lip pixels, based on the divisional centroid. Therefore, it is possible to reduce cases in which pixels which actually form part of the upper lip is mistaken as lower lip pixels. That is, in general, the surface area of the lower lip is broader than the surface area of the upper lip, so the total centroid is positioned close to the lower lip. As a result, if lip pixels are divided into upper and lower lip pixels based on the total centroid, actually, the pixels forming part of the lower lip are mistaken as upper lip pixels in many cases. In contrast, in case where lip pixels are temporarily divided into upper and lower lip pixels based on the total centroid, upper and lower centroids are obtained, a divisional centroid is further obtained, and lip pixels are divided into final upper and lower lip pixels based on the divisional centroid, the divisional centroid is positioned close to the upper centroid. It is therefore, possible to reduce cases in which pixels forming part of the lower lip are not mistaken as upper lip pixels.

In the embodiment shown in FIG. 3, lips of a speaker (user) are approximated by ellipses. In addition, other parts of a human face such as eyes or the like than lips can be approximated also by ellipses, as in the case described above.

Also, in the embodiment shown in FIG. 3, lips are divided into two of upper and lower lips. For example, only the upper lip can further be divided into two of left and right sides, so the lips are divided into total three parts each of which may be approximated by ellipses. Otherwise, each of the upper and lower lips can further be divided into two of left and right sides, so the lips are divided into total four parts each of which may be approximated by ellipses.

Figure 8:
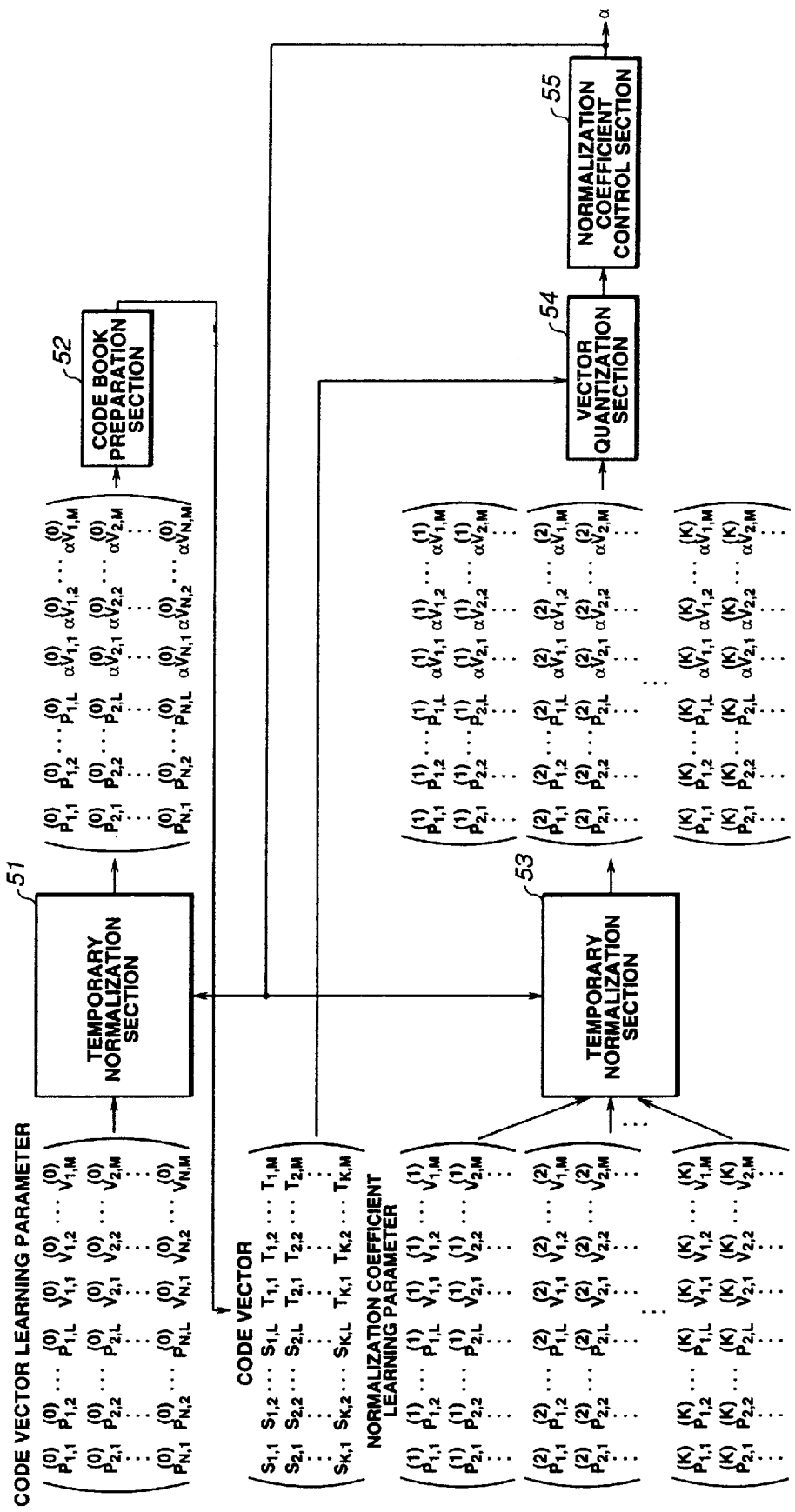
FIG. 8 is a block diagram showing a structural example of an embodiment of a learning apparatus which performs learning of a normalization coefficient used by an inter-media normalization section 21 shown in FIG. 1.

Next, the inter-media normalization section 21 shown in FIG. 1 normalizes characteristic parameters of various type of data pieces from the parameterization circuit 1 such that the parameters can be dealt with by equal weighting. This normalization is achieved by multiplying each characteristic parameter by a normalization coefficient. Further, the normalization coefficient is obtained by performing leaning. FIG. 8 shows a structural example of an embodiment of a learning apparatus which performs the learning.

To simplify explanation, explanation will be made of learning for obtaining a normalization coefficient for equalizing weights of characteristic parameters of an image and a speech as two different media.

A temporary normalization section 51 is supplied with characteristic parameters $P_{i,j}$ of an image and characteristic parameters $V_{i,j}$ of speech as code vector learning parameters (code book generation data) for generating a code book used for vector quantization (wherein a plurality of sets of characteristic parameters $P_{i,j}$ and speech characteristic parameters $V_{i,j}$ are supplied for each phoneme as a recognition target). The temporary normalization section 51 temporarily normalizes the characteristic parameters $P_{i,j}$ and the speech characteristic parameters $V_{i,j}$ by a normalization coefficient from a normalization coefficient control section 55, and supplies the parameters to the code book preparation section 52. That is, in the present embodiment, to equalize the weight of the characteristic parameter $V_{i,j}$ of a speech to the weight of the characteristic parameter $P_{i,j}$ of an image taken as a reference, the speech characteristic parameter $V_{i,j}$ is multiplied by a normalization coefficient $\alpha$. Accordingly, it can be considered that the characteristic parameter $P_{i,j}$ of an image is multiplied by 1 as a normalization coefficient.

Here, the suffix i representing a row of characteristic parameters $P_{i,j}$ and $V_{i,j}$ expresses a time point (time) when the characteristic parameters $P_{i,j}$ and $V_{i,j}$ are extracted, and the suffix j representing a column expresses a degree (dimension) of characteristic parameters $P_{i,j}$ and $V_{i,j}$ (accordingly ($P_{i,1}$, $P_{i,2}$, ... $P_{i,L}$, $V_{i,1}$, $V_{i,2}$. . . $V_{i,M}$) are characteristic parameters at a time point i). Also, in FIG. 8, the characteristic parameter $P_{i,j}$ is added with a parenthesized suffix (k) and expressed as $p^{(k)}_{i,j}$. This means that the characteristic parameter is generated from different learning data if k differs. This also applies to the case of the suffix (k) of $V^{(k)}_{i,j}$.

Also, in the present embodiment, the lateral radius and the upper and lower longitudinal radiuses of ellipses approximated to the lips can be used as the characteristic parameters $P_{i,j}$ of an image. In this case, the degree of the characteristic parameters $P_{i,j}$ is three. Also, for example, a linear spectrum pair having a degree of eight can be used as the characteristic parameter $V_{i,j}$ of a speech. In this case, the degree M of the characteristic parameter $V_{i,j}$ is eight.

The code book preparation section 52 generates a code book used for vector quantization in the vector quantization section 54, with use of code vector learning parameters $P_{i,j}$ and $V_{i,j}$ as temporarily normalized characteristic parameters, and supplies the code book to the vector quantization section 54.

Here, the code book preparation section 52 prepares a code book, for example, according to a LBG (Linde, Buzo, Gray) algorithm.

The LBG algorithm is a so-called batch-type learning algorithm repeatedly carries out Voronoi division for optimally dividing a characteristic parameter space in correspondence with a distance between a characteristic parameter as a learning sample (learning data) and a code vector (representative vector) forming a code book, and updating of code vectors with respect to the centroid bf each partial region of a characteristic parameter space, obtained by the Voronoi division, thereby to converge locally a code vector of a code book to an optimal position.

Where a set of learning samples is $x_j$ (j=0, 1, ..., J-1) and a set of code vectors is $Y=\{y_0, y_1, ..., y^{Na-1}\}$ (where Na expresses the number of code vectors and is set arbitrarily), the set $x_j$ of learning samples is divided into Na partial sets $S_i$ (i=0, 1, ..., Na-1) by the Voronois division. That is, where the distance between the learning sample $x_j$ and the code vector $y_i$ is expressed as d $(x_j, y_i)$, the learning sample $x_j$ is regarded as belonging to a partial set $S_i$ ($x_j \in S_i$) if the following formula is satisfied with respect all of t (t=0, 1, ..., Na-1) that are not equal to i.

$$d(x_j, y_i) < d(x_j, y_t) \quad (3)$$

Suppose that with respect to vectors $v_0, v_1, ..., v_{M-1}$, the centroid C $(v_0, v_1, ..., V_{M-1})$ is defined by the following formula.

$$C(v_0, v_1, ..., v_M - 1) = \underset{v}{\arg\min}\left\{\frac{1}{M}\sum_{m=0}^{M-1} d(v, vm)\right\} \quad (4)$$

Then, in the update of the code vectors, the code vector yi is updated by the following formula.

$$y_i = C(\{S_i\}) \quad (5)$$

Note that arg min { } in the right side of the formula (4) means a vector v which minimizes the value in { }. Also, a so-called clustering method depending on the formula (5) is called a k-means method.

Also, details of the LBG algorithm are described in, for example "ONSEI GAZO KOGAKU" by Nakata Kazuo and Minami Shun, SHOKO-DO, 1987, pages 29 to 31.

In the embodiment of FIG. 8, the suffix i,j expressing the row of the elements $S_{i,j}$ and $T_{i,j}$ in the code book outputted by the code book preparation section 52 expresses an j-th element of code vectors corresponding to a code #i. Therefore, $(S_{i,1}, S_{i,2}, ..., S_{i,L}, T_{i,1}, T_{i,2}, ..., T_{i,M})$ express code vectors corresponding to the code #i. Also, the element $S_{i,j}$ of the code vector corresponds to an image, and the element $T_{i,j}$ corresponds to speech.

The temporary normalization section 53 is supplied with characteristic parameters $P_{i,j}$ of an image and characteristic parameters $V_{i,j}$ of speech (which are obtained from an image and a speech different from the code vector learning parameters). Like the temporary normalization section 51, the temporary normalization section 53 temporarily normalizes the characteristic parameters $P_{i,j}$ and the speech characteristic parameters $V_{i,j}$, by a normalization coefficient from the normalization coefficient control section 55, and supplies the normalized parameters to a vector quantization section 54. That is, the temporary normalization section 53 multiplies the speech characteristic parameters $V_{i,j}$ by a normalization coefficient a from the normalization coefficient control section 55, among the characteristic parameters $P_{i,j}$ of an image and speech characteristic parameters $V_{i,j}$ as normalization coefficient learning parameters, and supplies the results to the vector quantization section 54.

The temporary normalization section 53 is supplied with a plurality of sets of normalization coefficient learning parameters, and performs normalization on each of the normalization coefficient learning parameters of the plurality of sets.

The vector quantization section 54 vector-quantizes the normalization coefficient learning parameters supplied and normalized by the temporary normalization section 53, with use of the newest code book from the code book preparation section 52, and supplies quantization errors of the vector-quantization to the normalization coefficient control section 55.

That is, the vector quantization section 54 calculates the distance (Euclidean distance) between each of the code vectors of the code book and the normalized normalization coefficient learning parameter, for each of the image and speech, and supplies the shortest one of the distances, as a quantization error, to the normalization coefficient control section 55. That is, the distances between the characteristic parameters $P_{i,j}$ of an image and the vector composed of elements $S_{i,j}$ of each code vector relating to the image in the code book are calculated, and the shortest one of the distances is supplied as a quantization error with respect to the image, to the normalization coefficient control section 55. Also, the distances between the characteristic parameters $\alpha V_{i,j}$ of a speech among the normalized normalization coefficient learning parameters and the vector composed of elements $T_{i,j}$ of each vector relating to the speech in the code book are calculated, and the shortest one of the distances is supplied as a quantization error with respect to the speech, to the normalization coefficient control section 55.

The normalization coefficient control section 55 accumulates (totalizes) quantization errors with respect to each of the image and speech from the vector quantization section 54, with respect to all the normalization coefficient learning parameters, and changes the normalization coefficient a to be supplied to the temporary normalization sections 51 and 53, such that the accumulation values with respect to the image and speech are equal to each other.

Figure 9:
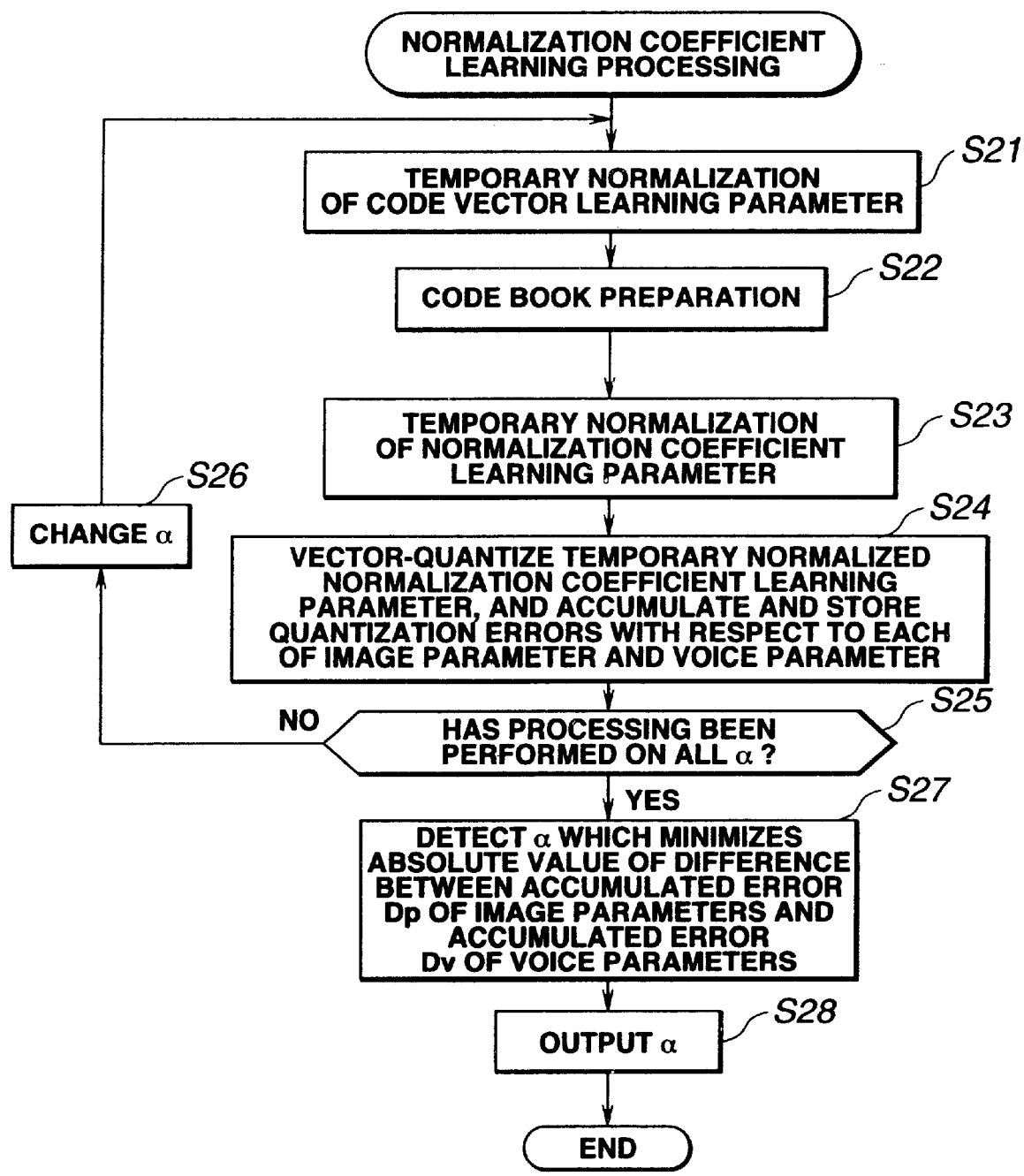
FIG. 9 is a flowchart for explaining processing in the learning apparatus shown in FIG. 8.

Next, with reference to the flowchart shown in FIG. 9, explanation will be made of processing (normalization coefficient learning processing) which the learning apparatus shown in FIG. 8 carries out. In the learning apparatus shown in FIG. 8, at first, code vector learning parameters are supplied to the temporary normalization section 51, and normalization coefficient learning parameters are supplied to the temporary normalization section 53. An initial value of the normalization coefficient α is supplied from the normalization coefficient control section 55 to the temporary normalization sections 51 and 53.

Further, in a step S21, the temporary normalization section 51 multiplies the characteristic parameters $V_{i,j}$ of a speech among code vector learning parameters by a normalization coefficient α from the normalization coefficient control section 55, thereby to normalize temporarily the code vector learning parameters, and supplies the code vector learning parameters to the code book preparation section 52.

Upon receipt of the normalized code vector learning parameters from the temporary normalization section 51, the code book preparation section 52 uses the code vector learning parameters, to prepare a code book which is used for the vector quantization section 54 to carry out vector quantization, by an LBG algorithm, and supplies the code book to the vector quantization section 54.

Meanwhile, in a step S23, the temporary normalization section 53 multiplies the characteristic parameters $V_{i,j}$ of a speech among the normalization coefficient learning parameters by a normalization coefficient a from the normalization coefficient control section 55, thereby to normalize temporarily the normalization coefficient learning parameters, and supplies the parameters to the vector quantization section 54.

Upon receipt of the normalized code vector learning parameters from the temporary normalization section 51, the code book preparation section 52 in a step S22 uses the code vector learning parameters, to prepare a code book which is used for the vector quantization section 54 to carry out vector quantization, by an LBG algorithm, and supplies the code book to the vector quantization section 54.

That is, in the step S24, the vector quantization section 54 calculates the distances between the characteristic parameters $P_{i,j}$ of an image (image parameters) among normalized normalization coefficient learning parameters and the vector composed of elements $S_{i,j}$ relating to the image among code vectors, and supplies the shortest one of the distances, as a quantization error with respect to the image, to the normalization coefficient control section 55. Also, the vector quantization section 54 calculates the distances between the characteristic parameters $\alpha V_{i,j}$ of a speech (speech parameters) among the normalized normalization coefficient learning parameters and the vector composed of elements $T_{i,j}$ relating to the speech in the code book among code vectors, and supplies the shortest one of the distances, as a quantization error with respect to the speech, to the normalization coefficient control section 55.

Here, since the temporary normalization section 53 is supplied with a plurality of normalization coefficient learning parameters, as described above, the vector quantization section 54 is supplied with a plurality of sets of temporarily normalized normalization coefficient learning parameters. The vector quantization section 54 obtains quantization errors with respect to the image and speech as described above, sequentially, with respect to each of the plurality of normalized normalization coefficient learning parameters, and supplies the quantization errors to the normalization coefficient control section 55.

In a step S24, the normalization coefficient control section 55 further accumulates the quantization errors with respect to each of the image and speech supplied from the vector quantization section 54, with respect to all the normalization coefficient learning parameters, and obtains accumulation values $D_p$ and $D_v$ of the quantization errors. These accumulation values $D_p$ and $D_v$ of the quantization errors with respect to the image and speech are supplied to the normalization coefficient control section 55 and stored.

Further, the processing goes to a step S25, the normalization coefficient control section 55 determines whether or not the accumulation values $D_p$ and $D_v$ of quantization errors with respect to the image and speech have been obtained with respect to all values of $\alpha$. That is, in the present embodiment, for example, the accumulation values $D_p$ and $D_v$ are obtained while changing $\alpha$ to range from 0.001 as an initial value to 2.000 in steps each being 0.001 (increase in this case), and the normalization coefficient control section 55 determines whether or not accumulation values $D_p$ and $D_v$ of quantization errors with respect to the image and speech have been obtained with respect to $\alpha$ having a range described above.

In the step S25, if it is determined that the accumulation values $D_p$ and $D_v$ are not yet been obtained with respect to all values of $\alpha$. The processing goes to the step S26, and the normalization coefficient control section 55 changes the normalization coefficient $\alpha$ as described above and supplies $\alpha$ to the temporary normalization sections 51 and 53. Further, the processing returns to the step S21, and the same processing as described above is repeated with use of the changed normalization coefficient $\alpha$.

Meanwhile, in the step S25, if it is determined that the accumulation values $D_p$ and $D_v$ have been obtained with respect all the values of $\alpha$, the processing goes to a step S27, and the normalization coefficient control section 55 calculates an absolute value $|D_p-D_v|$ of the difference between the quantization error $D_p$ concerning the image and the quantization error $D_v$ concerning the speech with respect to $\alpha$ of each value stored in the step S24. Further, the normalization coefficient control section 55 detects $\alpha$ which provides the minimum value of the differential absolute value $|D_p-D_v|$ concerning $\alpha$ of each value, i.e., $\alpha$ in case where the quantization error $D_p$ with respect to the image and the quantization error $D_v$ with respect to the speech are equal to each other. Further, the processing goes to a step S28, and the normalization coefficient control section 55 outputs the normalization coefficient $\alpha$ which provides the minimum absolute value $|D_p-D_v|$ as a coefficient which can normalize the characteristic parameters of the image and speech such that these characteristic parameters can be dealt with by equal weights.

As described above, the code vector learning parameters as integrated parameters composed of characteristic parameters of an image and speech are normalized, and the normalized code vector learning parameters are used to generate a code book. Meanwhile, normalization coefficient learning parameters as integrated parameters composed of characteristic parameters of an image and speech are temporarily normalized, and vector quantization is carried out with use of the generated code book, with respect to the characteristic parameters of each of an image and speech among the normalized normalization coefficient learning parameters, thereby to obtain accumulation values of the quantization. The normalization coefficient is changed such that the accumulation values are equal to each other. Therefore, it is possible to obtain a normalization coefficient which enables normalization such that the characteristic parameters of different media such as an image and a speech can be dealt with by equal weights.

As a result, for example, when characteristic parameters extracted from a speech and characteristic parameters extracted from an image of lips are normalized by the normalization coefficient and are further integrated into integrated parameters. In case where recognition of a speech is carried out, improvements of the recognition rate can be prevented from being hindered due to influences which either the speech or the image receives strongly.

Further, it is possible to carry out easily verification of influences on the recognition rate from the characteristic parameters of each media, which construct integrated parameters.

In the embodiment shown in FIG. 8, explanation has been made of learning for obtaining a normalization coefficient $\alpha$ for equalizing the weights of characteristic parameters of two types, such as an image and speech. However, it is also possible to carry out learning for obtaining a normalization coefficient for equalizing weights of characteristic parameters three or more types or other media than the image and speech, in a similar manner.

Also, the learning method for normalization coefficients as described above does not depend on the types of characteristic parameters or dimensions thereof and can therefore be applied regardless of the types and dimensions of characteristic parameters.

Figure 10:
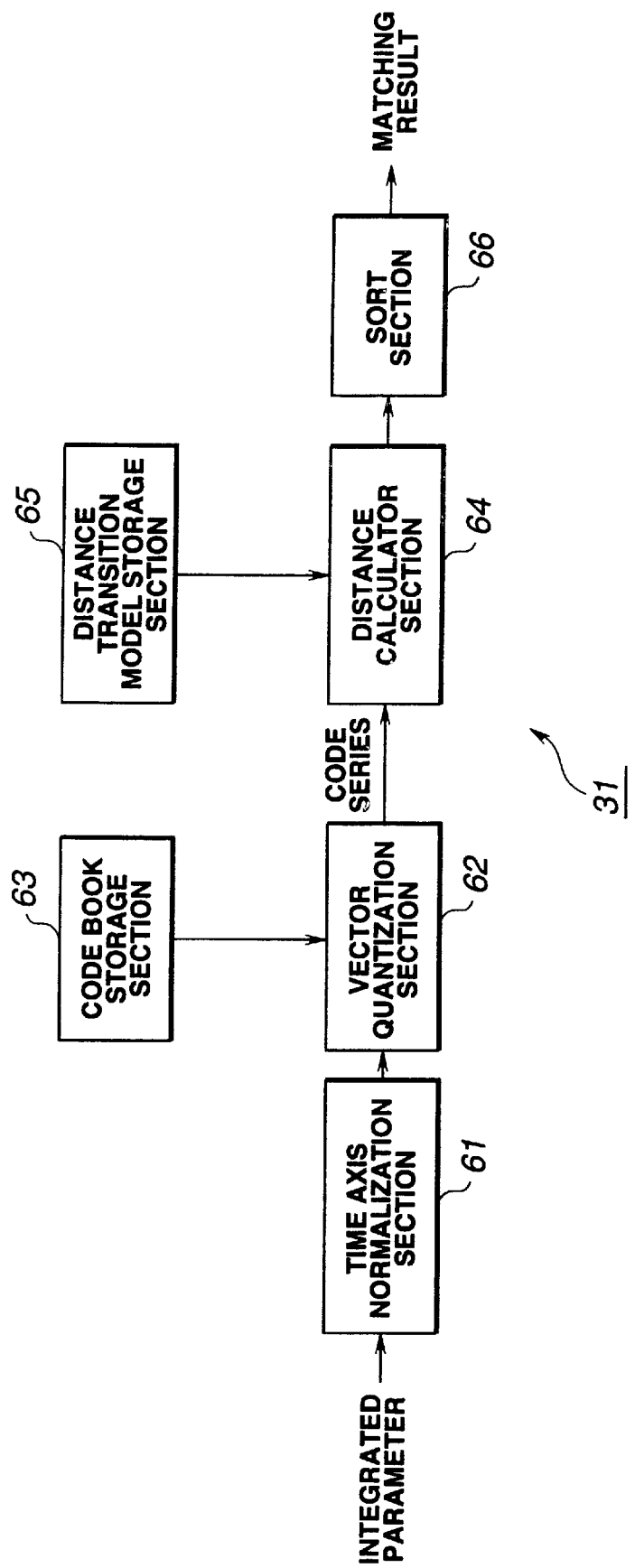
FIG. 10 is a block diagram showing a structural example of an embodiment of a distance transition type matching section shown in FIG. 1.

Next, FIG. 10 shows a structural example of a distance transition system matching section 31 shown in FIG. 1. The time-axis normalization section 61 is supplied, in time series, with integrated parameters when a word is spoken, from the integrated parameter generator circuit 2 (FIG. 1). The time-axis normalization section 61 performs time-axis normalization on the integrated parameters in time series.

Figure 11A:
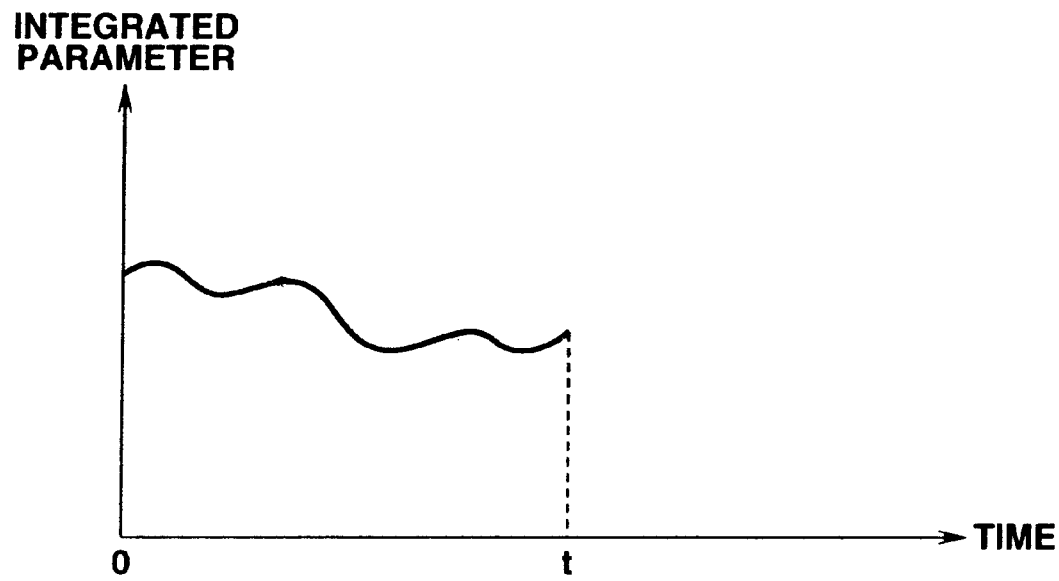
FIGS. 11A and 11B are graphs for explaining processing of a time-axis normalization section 61 shown in FIG. 10.
Figure 11B:
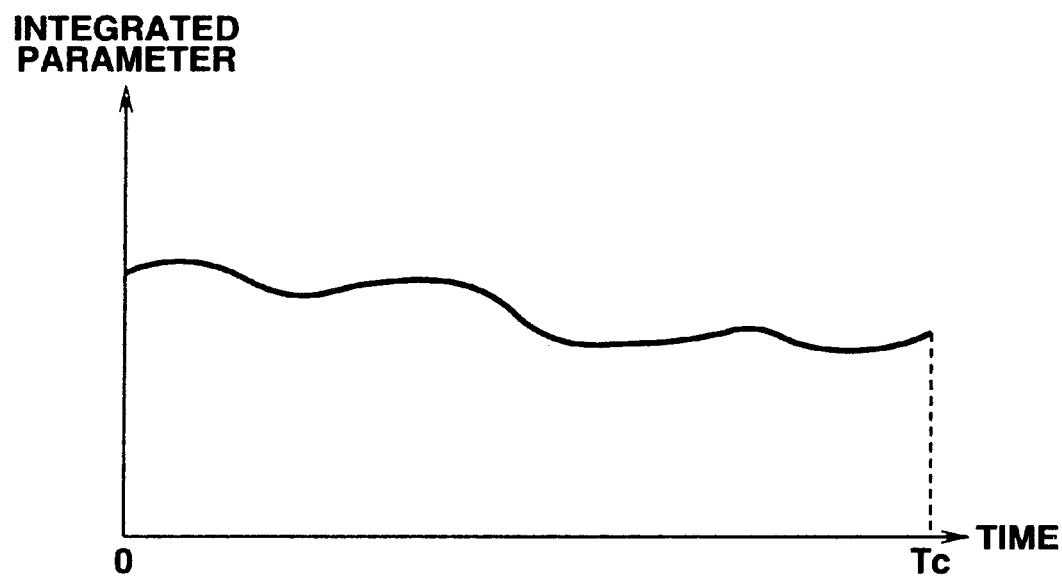

That is, where the speaking time when a word is spoken is t, for example, the time-based change of a certain element of the integrated parameters depending on speech of the word is as shown in FIG. 11A. However, the speaking time t in FIG. 11 changes for every speech even if one same person speaks one same word. Therefore, as shown in FIG. 11B, the time-axis normalization section 61 performs time-axis normalization such that the speaking time t becomes uniformly a time $T_c$. For example, supposing now that word recognition is carried out in the speech recognition apparatus shown in FIG. 1, the time $T_c$ is set to a time which is sufficiently longer than a general speaking time which is usually taken to speak the word as a recognition target. Therefore, in the time-axis normalization section 61, the time-based integrated parameter shown in FIG. 11A is changed such that the parameter is elongated in the time-axis direction. Note that the method of time-axis normalization is not limited hitherto.

The integrated parameter after the time-axis normalization is supplied from the time-axis normalization section 61 to the vector quantization section 62. The vector quantization section 62 uses a code book stored in the code book storage section 63 to vector-quantize the integrated parameters subjected to the time-axis normalization, sequentially, and supplies the codes as the vector quantization results, i.e., the codes corresponding to code vectors having the shortest distance to the integrated parameters, to a distance calculator section 64, sequentially.

The code book storage section 63 stores a code book which the vector quantization section 62 uses for vector quantization.

The distance calculator section 64 accumulates distances to the code vectors when a series of codes outputted from the vector quantization section 62 are observed, for every time, from distance transition models of the word as a recognition target, which are stored in the distance transition model storage section 65, and supplies an accumulation value thereof to a sort section 66.

Figures 12A, 12B:
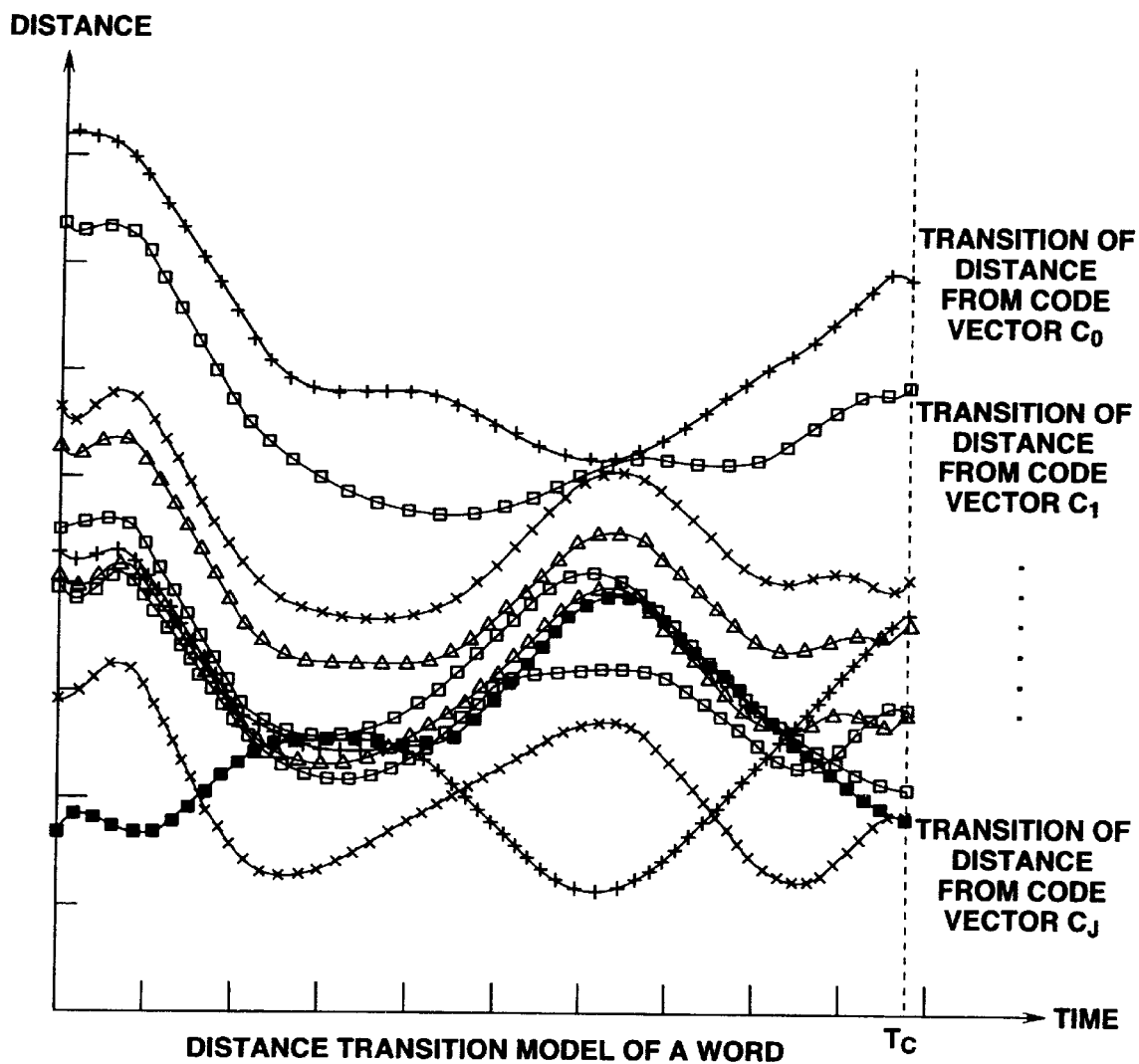
FIGS. 12A and 12B are a graph and a table for explaining distance transition models stored in a distance transition model storage section 65 shown in FIG. 10.

The distance transition model storage section 65 stores, for example, a distance transition model, as shown in FIG. 12B, which expresses a transition of the distance between the integrated parameter in time series (standard series) of the word as a recognition target and each code vector of the code book stored in the code book storage section 63. That is, the distance transition model storage section 65 stores the distance transition model shown in FIG. 12B and obtained by learning described later, for each of the words as recognition targets.

In the embodiment shown in FIG. 12B, it is supposed that the code book stored in the code book storage section 63 has J+1 code vectors $C_0$ to $C_j$. Also, FIG. 12A shows distance transition models in form of a graph, and FIG. 12B shows also distance transition models in form of a table. Where attention is paid to the row of code vectors $C_j$ in the table shown in FIG. 12B, the distances $D_{ejt0}$, $D_{ejt1}$, $D_{ejt2}$, ... at the time points $t_0$, $t_1$, $t_2$, ... expresses transition of the distance with respect to the code vector $C_j$ in the graph of FIG. 12A.

The sort section 66 selects upper Nb accumulation values (where Nb is a natural number) in the order from the smallest one, among accumulation values of the distances with respect to the distance transition models of each word as a recognition target, supplied from the distance calculator section 64, and outputs the selected accumulation values as results of matching between the integrated parameters and the distance transition models, to the determination circuit 4.

Figure 13:
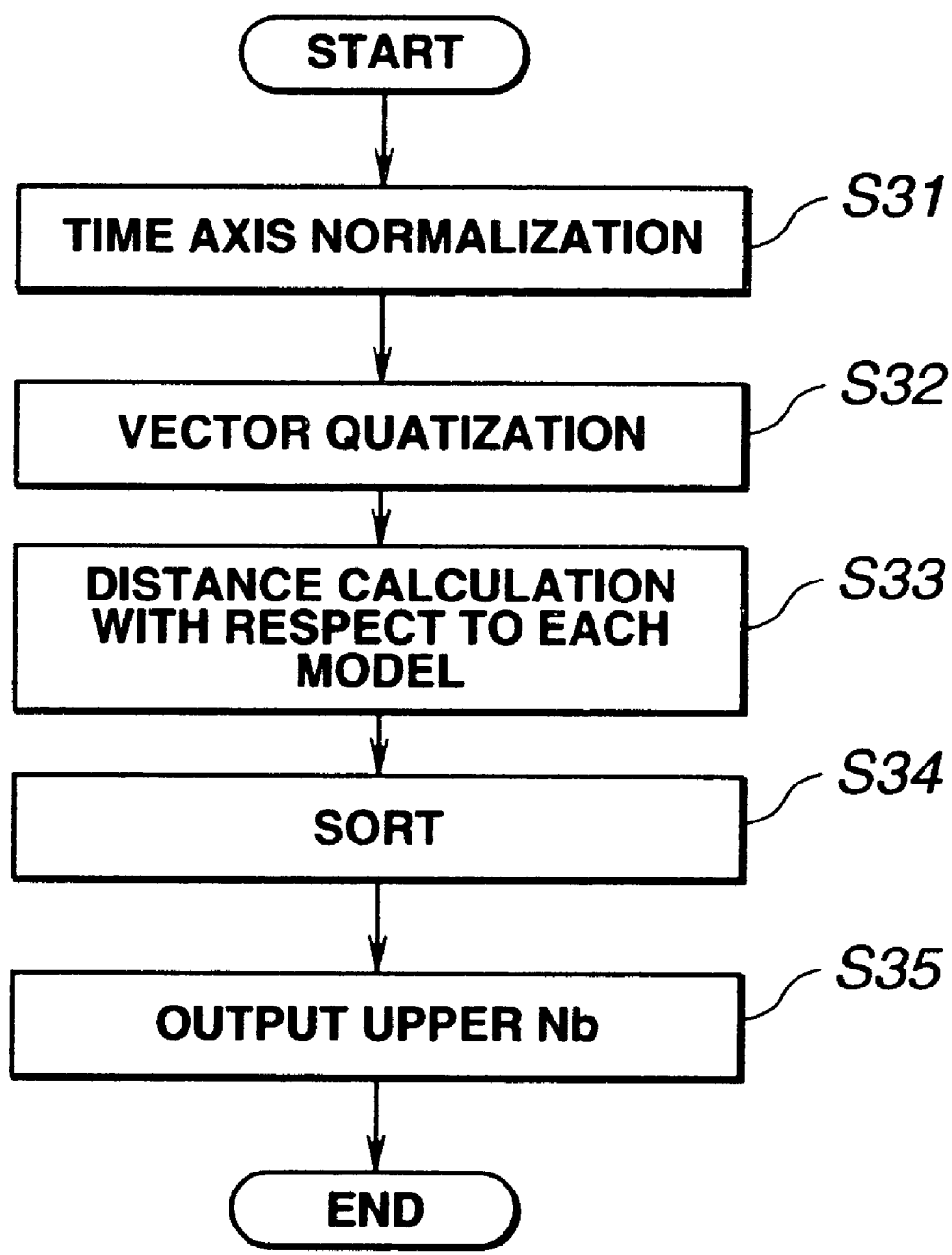
FIG. 13 is a flowchart for explaining processing in a distance transition type matching section 31 shown in FIG. 10.

The distance transition type matching section 31 constructed as described above performs matching depending on a distance transition system, and the matching processing depending on this distance transition system will be explained with reference to the flowchart shown in FIG. 13.

Upon receipt of integrated parameters in time series, corresponding to speech of a word, the time-axis normalization section 61 performs time-axis normalization on the integrated parameters in time series, and outputs the parameters to the vector quantization section 62, in a step S31. In a step S32, the vector quantization section 62 refers to the code book stored in the code book storage section 63, thereby to sequentially vector-quantize integrated parameters from the time-axis normalization section 61, and supplies a series of codes corresponding to the code vectors which minimizes the distances to the integrated parameters, as vector quantization results, to the distance calculator section 64.

The distance calculator section 64 accumulates the distances to the code vectors when the series of codes outputted by the vector quantization section 62 are observed, from the distance transition models of the word as a recognition target, stored in the distance transition model storage section 65.

That is, where the code at a time t is expressed as $S_t$ (t=0 1, ..., $T_c$), among the series of codes outputted by the vector quantization section 62, the distance calculator section 64 obtains the distance at a time point #0 with respect to a code vector $C_j$ (j=0, 1, ..., j) corresponding to a code $S_0$ which the vector quantization section 62 outputs firstly, by referring to distance transition models. More specifically, for example, where the code vector corresponding to the code $S_0$ is $C_0$, the distance at the time point #0 is obtained on the curve expressing transition of the distance from the code vector $C_0$, in FIG. 12A.

Further, the distance calculator section 64 obtains the distance at a time point #1 to the code vector $C_j$ corresponding to the code $S_1$ which the vector quantization section 62 outputs secondly, by referring to distance transition models. Subsequently, the distance calculator section 64 obtains sequentially distances up to the distance at the time point #$T_c$, to the code vector $C_j$ corresponding to the code $S_{Tc}$ which the vector quantization section 62 outputs last, by referring to distance transition models. The distance calculator section 64 further calculates an accumulation value of these distances.

Accordingly, for example, where codes $S_0$, $S_0$, $S_1$, ... are outputted at the time points #0, #1, #2, ... , a sum of the distance $D_{c0t0}$ at the time point #0 to the code vector $C_0$ corresponding to the code $S_0$, the distance $D_{c0t2}$ at the time point #1 to the code vector corresponding to the code $S_0$, the distance $D_{c0t2}$ at the time point #2 to the code vector $C_1$ corresponding to the code $S_1$, ... is obtained as an accumulation value.

Further, the distance calculation section 64 in a step S33 calculates the accumulation value of the distances with respect to each of all the distance transition models stored in the distance transition model storage section 65, and then outputs the accumulation value of the distances to the sort section 66. The program then goes to a step S34.

In the step S34, in the sort section 66, upper Nb accumulation values in the order from the smallest one are selected among accumulation values of the distances with respect to the distance transition models of each word as a recognition target, supplied from the distance calculator section 64. The processing goes to a step S35, and the selected accumulation values are outputted as results of matching between the integrated parameters and the distance transition models, to the determination circuit 4.

Figure 14:
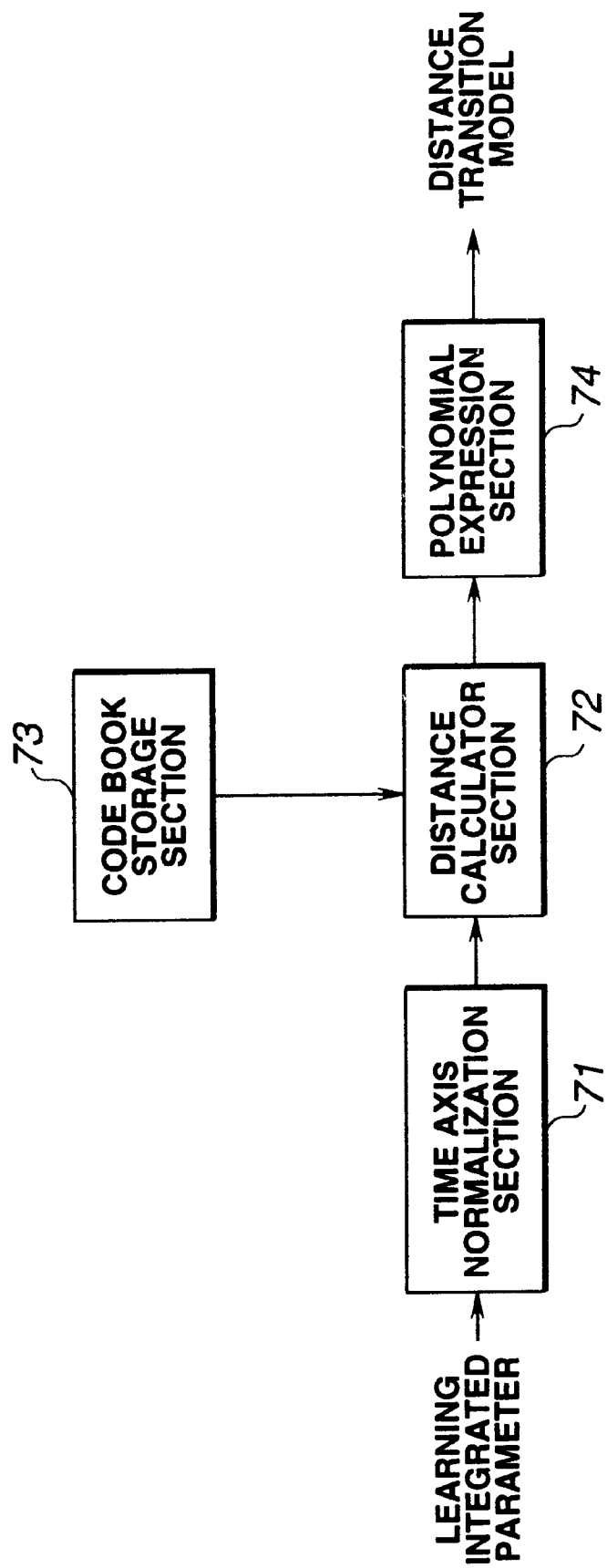
FIG. 14 is a block diagram showing a structural example of an embodiment of a learning apparatus which performs learning for obtaining a distance transition model.

Next, FIG. 14 shows a structural example of an embodiment of a learning apparatus which carries out learning for obtaining distance transition models to be stored into the distance transition model storage section 65 shown in FIG. 10. A time-axis normalization section 71 is supplied with learning integrated parameters in time series used for performing learning for obtaining distance transition models. The time-axis normalization section 71 performs time-axis normalization on the learning integrated parameters, like the time-axis normalization section 61 in FIG. 10, and supplies the parameters to a distance calculator section 72.

Figures 15A, 15B, 15C:
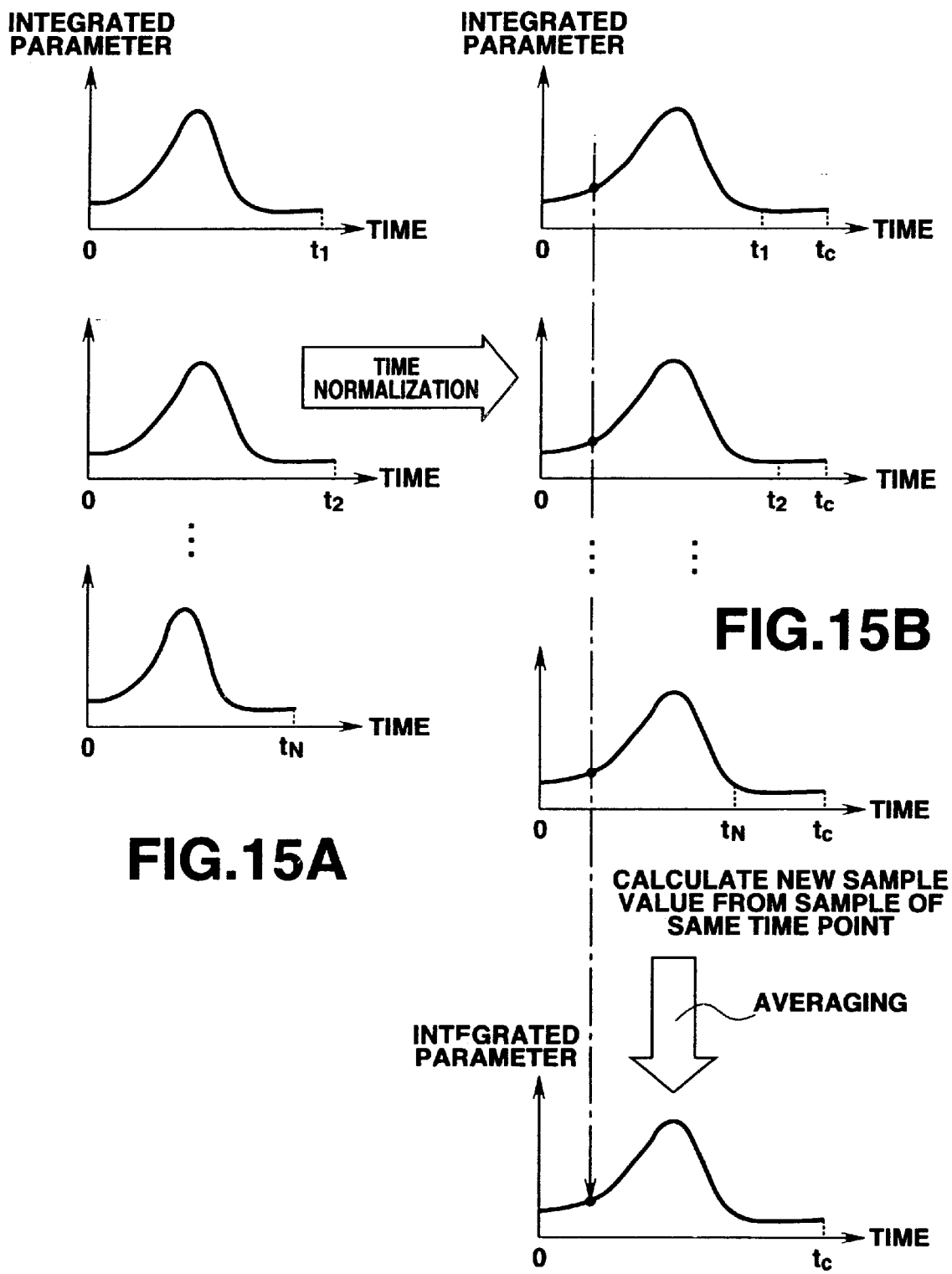
FIGS. 15A, 15B, and 15C are graphs for explaining processing in a distance calculator section shown in FIG. 14.

The time-axis normalization section 71 is supplied with a plurality of sets of learning integrated parameters in time series for obtaining a distance transition model of a certain word, for example. The section 71 performs time-axis normalization on each of the plurality of sets of learning integrated parameters, sums each set into one learning integrated parameter, and outputs the parameter. That is, the time-axis normalization section 71 is supplied with a plurality (Nc in FIG. 15A) of learning integrated parameters which do not always have an equal duration time with respect to one word. The time-axis normalization section 71 performs time-axis normalization such that each of the duration times of the plurality of learning integrated parameters becomes a time Tc as shown in FIG. 15B. Further, the time-axis normalization section 71 calculates, for example, an average value between sample values at one same time point, among the plurality of learning integrated parameters subjected to the time-axis normalization, and generates one learning integrated parameter which takes the average value as a sample value at each time point.

Note that the method of summing a plurality of learning integrated parameters into one learning integrated parameter is not limited hitherto. Also, where only one learning integrated parameter in time series for obtaining distance transition models of a word, the time-axis normalization section 71 performs time-axis normalization on the one learning integrated parameter, and outputs directly this parameter.

Figure 16:
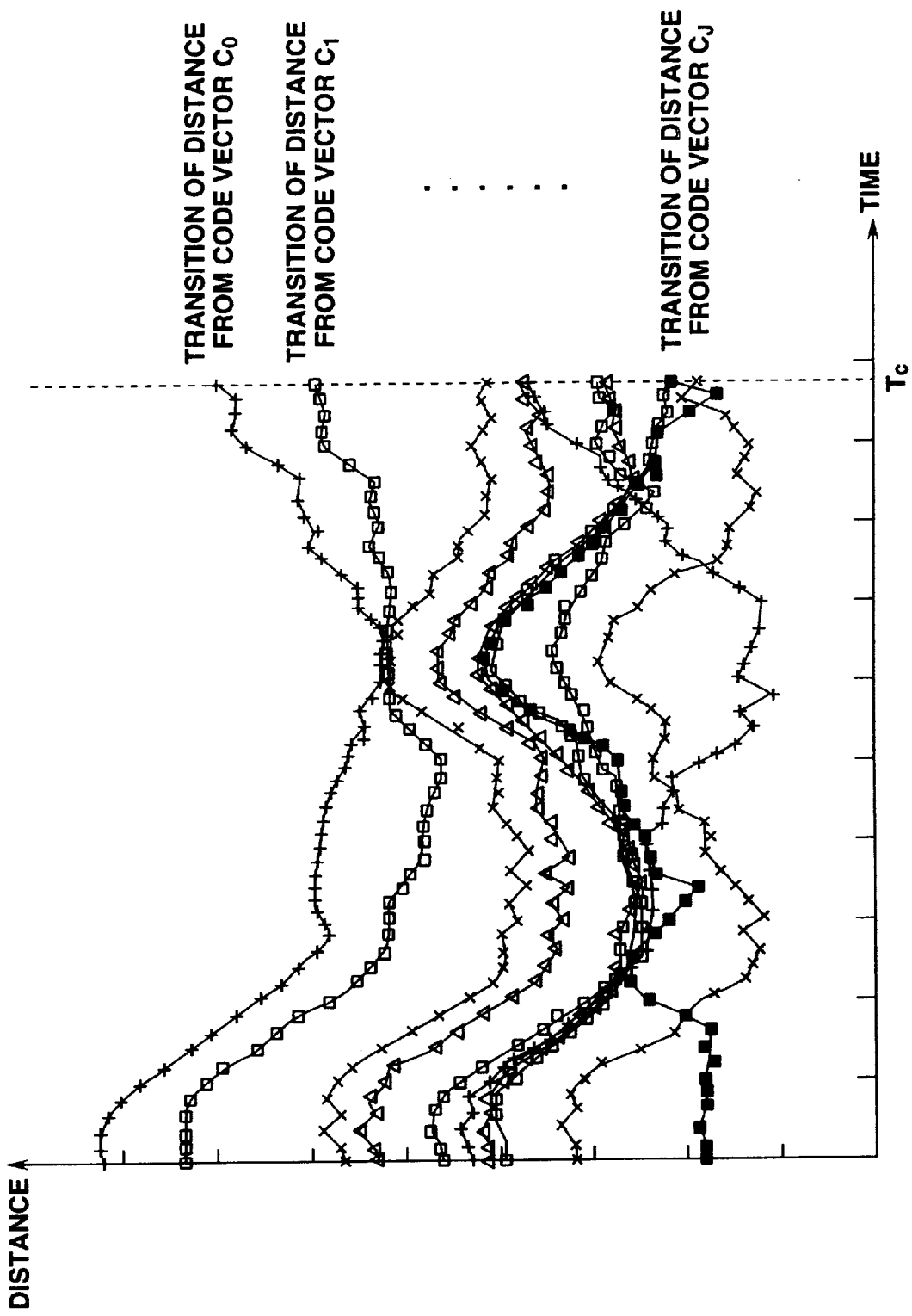
FIG. 16 is a graph showing transition of distances outputted by a distance calculator section 72 shown in FIG. 14.

The distance calculator section 72 calculates sequentially the distances between the code vectors of the code book stored in the code book storage section 73 and the learning integrated parameters in time series, supplied from the time-axis normalization section 71, as shown in FIG. 16, and supplies transition of the distances, i.e., the transition of the distances between the code vectors and the learning integrated parameters from the time point #0 to the time point #$T_c$ subjected to time-axis normalization, to a polynomial expression section 74.

The code book storage section 73 stores the same code book as that stored in the code book storage section 63 shown in FIG. 10. Note that the code books in the code book storage sections 63 and 73 may be the same as that prepared by the code book preparation section 52 (FIG. 8) or may be a different one.

The polynomial expression section 74 obtains a polynomial which approximates to the transition of the distances to the code vectors, which is supplied from distance calculation section 72, and outputs the polynomial as a distance transition model. That is, in the polynomial expression section 74, the transition of the distances shown in FIG. 16 is approximated by a curve expressed by the polynomial shown in FIG. 12A.

Figure 17:
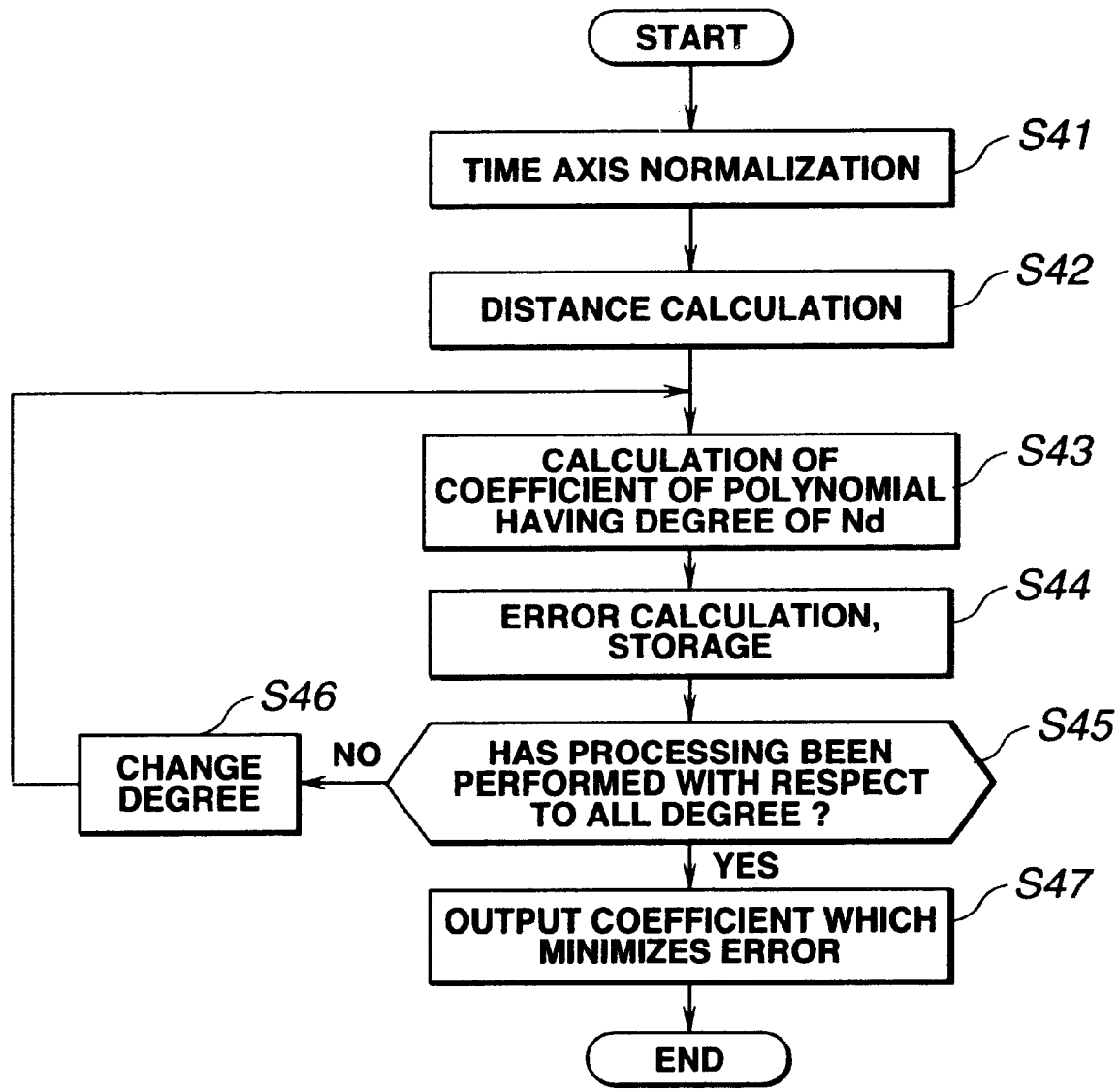
FIG. 17 is a flowchart for explaining processing in the learning apparatus shown in FIG. 14.

Next, with reference to the flowchart shown in FIG. 17, explanation will be made of the processing in the learning apparatus shown in FIG. 14. The time-axis normalization section 71 is supplied with a plurality of sets of learning integrated parameters in time series for obtaining a distance transition model of a certain word. In a step S41, the section 71 performs time-axis normalization on each of the plurality of sets of learning integrated parameters, sums each set into one learning integrated parameter, and outputs the parameter to a distance calculator section 72. In a step S42, the distance calculator section 72 sequentially calculates the distances between the code vectors in the code book stored in the code book storage section 73 and the learning integrated parameters in time series supplied from the time-axis normalization section 71, and supplies the transition of the distances to a polynomial expression section 74.

In a step S43, the polynomial expression section 74 obtains a polynomial having a degree of Nd, which approximates to the transition of the distances between the code vectors and the learning integrated parameters (standard series) supplied from the distance calculator section 72, for example, by means of a least square method.

That is, a polynomial $f_j(t)$ having a degree of Nd which approximates to the distance between the learning integrated parameter at a time point t and a code vector $C_j$ can be expressed as follows.

$$f_j(t) = a_{j0} + a_{j1}t^1 + a_{j2}t^2 + \ldots + a_{jNd}t^{Nd} \tag{6}$$

Accordingly, by a least square method, coefficients $a_{j0}$, $a_{j1}$, $a_{j2}$, ..., $a_{jNd}$ which define the formula (6) can be obtained by solving the formula described below, with use of the distance $f_j(t)$ between the learning integrated parameter at the time point t and the code vector $C_j$, obtained by the distance calculator section 72.

$$\begin{bmatrix} a_{j0} \\ a_{j1} \\ \vdots \\ a_{jNd-1} \\ a_{jNd} \end{bmatrix} = \begin{bmatrix} \sum t^{Nd} & \sum t^{Nd-1} & \cdots & \sum t^1 & \sum t^0 \\ \sum t^{Nd+1} & \sum t^{Nd} & \cdots & \sum t^2 & \sum t^1 \\ \vdots & \vdots & \ddots & \vdots & \vdots \\ \sum t^{2Nd-1} & \sum t^{2Nd-2} & & \sum t^{Nd} & \sum t^{Nd-1} \\ \sum t^{2Nd} & \sum t^{2Nd-1} & & \sum t^{Nd+1} & \sum t^{Nd} \end{bmatrix}^{-1} \begin{bmatrix} \sum f_j(t)t^0 \\ \sum f_j(t)t^1 \\ \sum f_j(t)t^{Nd-1} \\ \sum f_j(t)t^{Nd} \end{bmatrix} \tag{7}$$

The polynomial expression section 74 obtains a set A of coefficients as shown in the formula below, which defines the polynomial $f_j(t)$ having a degree of Nd which approximates to the transition of the distances between the learning integrated parameters and the code vectors $C_0, C_1, \ldots, C_j$, respectively, by solving the formula (7) with respect to the code vectors $C_0, C_1, \ldots, C_j$.

$$\begin{bmatrix} a_{00} & a_{01} & a_{02} & \cdots & a_{0Nd-1} & a_{0Nd} \\ a_{10} & a_{11} & a_{12} & \cdots & a_{1Nd-1} & a_{1Nd} \\ \vdots & \vdots & \vdots & \ddots & \vdots & \vdots \\ a_{j0} & a_{j1} & a_{j2} & \cdots & a_{jNd-1} & a_{jNd} \end{bmatrix} \tag{8}$$

Thereafter, the processing goes to a step S44, the polynomial expression section 74 obtains an accumulation value of square errors of the transition of the distances approximated by the set A of coefficients expressed by the formula (8) and the actual transition of distances as shown in FIG. 16, with respect to each code vector $C_j$, and stores the square errors together with the set A of coefficients. The processing then goes to a step S45. In the step S45, the polynomial expression section 74 determines whether or not the accumulation value of the square errors has been obtained with respect to all of the degrees Nd within a prepared range. If it is determined in the step S45 that the accumulation value of the square errors has not yet been obtained with respect to all of the degrees Nd within the prepared range, the processing goes to a step S46, and the polynomial expression section 74 changes the degree of Nd of the polynomial formula $f_j(t)$ indicated in the formula (6) to a value for which the accumulation value of the square errors has not been obtained. Further, the processing returns to the step S43, and subsequently, the same processing as described above is repeated with respect to the changed degree of Nd.

Otherwise, if it is determined in the step S45 that the accumulation value of the square errors has been obtained with respect to all the degrees of Nd within the prepared range, the processing goes to the step S47, and the polynomial expression section 74 detects the minimum value among the accumulation values of square errors of the transitions of distances with respect to all the degrees Nd within the prepared range, stored in the step S44, and outputs the set A of coefficients which define the polynomial $f_j(t)$ stored together with the minimum value, as a distance transition model of the word. The processing is then ended.

Note that the above processing is carried out for each of words as recognition targets.

As described above, with respect to learning integrated parameters in time series, normalization of time-axis is carried out. Distances between the learning integrated parameters (standard series) thus subjected to time-axis normalization and the code vectors are calculated. A distance transition model which expresses transition of the distances is obtained. It is hence possible to obtain models matched with the number of states and forms of transition of states, which a recognition target originally has. Therefore, according to such distance transition models, steady states and transiting states of a recognition target can be expressed precisely, and as a result, the recognition rate can be improved.

Also, transition of distances is approximated by a polynomial, so transition of distances can be expressed by only the coefficients which define the polynomial, i.e., by only a small amount of data.

Further, the degree of Nd of a polynomial which approximates to transition of distances is determined such that the accumulation value of square errors is minimized. Therefore, transition of distances can be expressed with high precision by the polynomial.

In FIG. 14, integrated parameters are used merely as learning data. However, in case of performing recognition by one single characteristic parameter, learning may be carried out, using the one single characteristic parameter as learning data.

Also, the learning method for distance transition models does not depend on the types or degrees of the characteristic parameters, and are therefore applicable regardless of the types and degrees of the characteristic parameters.

Further, in the case described above, transition of actual distances as shown in FIG. 16 is subjected to matching with use of distance transition models approximated by a polynomial as shown in FIG. 12A. However, the matching can be performed by using the transition of actual distances as shown in FIG. 16 directly as distance transition models.

Figure 18:
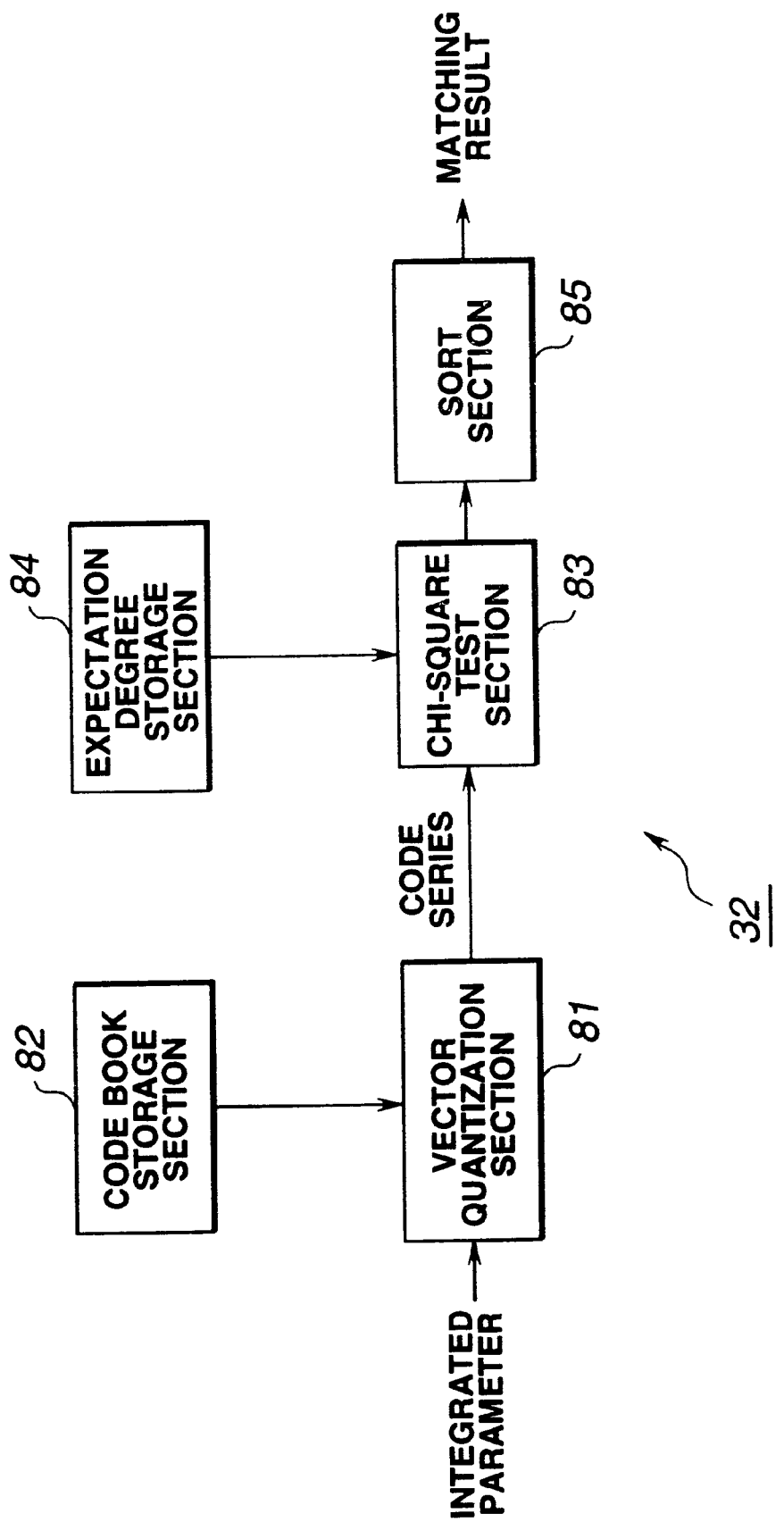
FIG. 18 is a block diagram showing a structural example of an embodiment of the space distribution type matching section 32 shown in FIG. 1.

Next, FIG. 18 shows a structural example of the space distribution type matching section 32 shown in FIG. 1. A vector quantization section 81 is supplied with integrated parameters in time series from the integrated parameter generator circuit 2 shown in FIG. 1. The vector quantization section 81 vector-quantizes the integrated parameters in time series, with use of a code book stored in a code book storage section 82, and supplies a series of codes as results of the vector quantization, to a chi-square ($\chi^2$) test section 83, sequentially.

The code book storage section 82 stores a code book used for vector quantization in the vector quantization section 81.

The chi-square test section 83 refers to an expectation degree storage section 84, and obtains properness concerning whether or not a space distribution of a code series from the vector quantization section 81 is similar to a space distribution of a code series obtained when a word as a recognition target is spoken, that is, whether or not integrated parameters supplied to the vector quantization section 81 correspond to a word as a recognition target, by carrying out a chi-square test. The section 83 also supplies the properness to a sort section 85.

The expectation degree storage section 84 stores an expectation degree observed when an integrated parameter corresponding to the word as a recognition target is inputted (i.e., when supplied to the vector quantization section 81, the expectation degree is outputted therefrom), with respect to each of codes in the code book stored in the code book storage section 82 which correspond to the code vectors of the code book.

The sort section 85 selects upper Nb words in the order from a word having the highest properness, based on the properness as to whether or not the inputted integrated parameter supplied from the chi-square test section 83 corresponds to the word as a recognition target, and outputs the selected words as results of matching according to the space distribution system, to the determination circuit 4 (FIG. 1).

Figure 19:
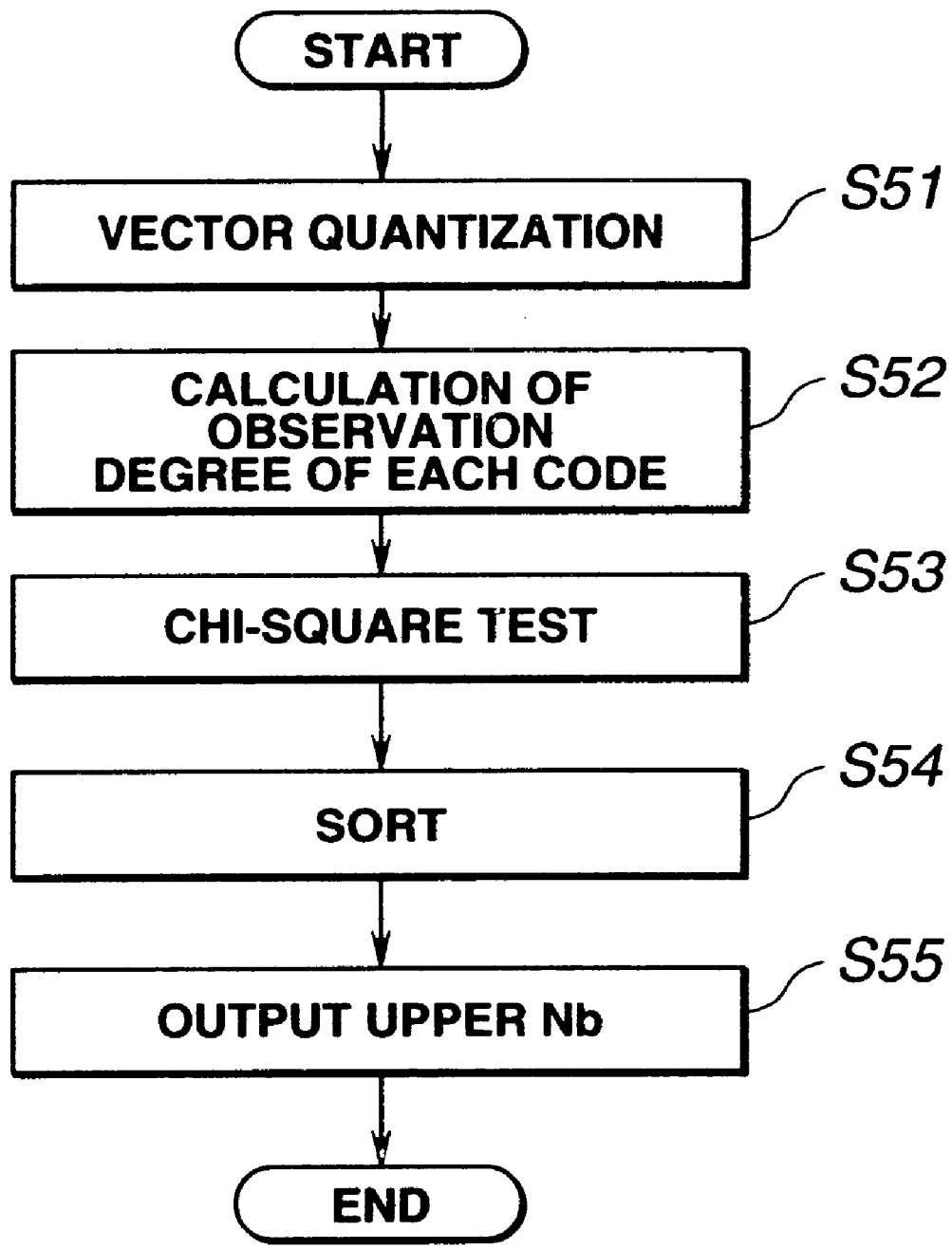
FIG. 19 is a flowchart for explaining processing in the space distribution type matching section 32 shown in FIG. 18.

In the space distribution type matching section 32 constructed as described above, matching according to the space distribution system is carried out, and explanation will now be made of the matching processing according to the space distribution system, with reference to the flowchart shown in FIG. 19.

Integrated parameters to be recognized are supplied in time series to the vector quantization section 81. In a step S51, the vector quantization section 81 sequentially vector-quantizes the integrated parameters in time series, and supplies a series of codes as results of the vector quantization, to the chi-square test section 83.

In a step S52, the chi-square test section 83 obtains a space distribution of the code series from the vector quantization section 81. That is, the chi-square test section 83 counts the number of times for which each code is observed (hereinafter called an observation degree) among the code series from the vector quantization section 81. Further, the processing goes to a step S53, and the chi-square test section 83 performs a chi-square test, with use of the observation degree of each code and a expectation degree stored in the expectation degree storage section 84, as the number of times for which each code is expected to be observed when a word as a recognition target is spoken, thereby to obtain a degree (hereinafter called a similarity degree) at which the observation degree of each code with respect to an inputted integrated parameter is similar to the expectation degree of each code with respect to the word as a recognition target. The chi-square test section 83 then outputs the similarity degree to the sort section 85.

That is, the chi-square test section 83 expresses the observation degree of a code #j as $F_j$ as well as the expectation degree of a code #j of a word W as $f_j$. The section 83 then calculates $\chi^2$ (chi-square) indicated in the formula below, and outputs, for example, a reciprocal of the chi-square, as a similarity degree with respect to the word W, to the sort section 85.

$$X^2 = \sum_{i=0}^{J} \frac{(F_i - f_i)^2}{f_j} \qquad (9)$$

The $\chi^2$ indicated in the formula (9) is smaller as the observation degree of each code with respect to an inputted integrated parameter is more similar to the expectation degree of each code with respect to the word as a recognition target. Therefore, the similarity degree as a reciprocal thereof is larger as the observation degree of each code with respect to an inputted integrated parameter is more similar to the expectation degree of each code with respect to the word as a recognition target.

Upon receipt of similarity degrees with respect to all the words as recognition targets, the sort section 85 selects upper Nb similarity degrees, in a step S54. The processing then goes to a step S55, and the section 85 outputs the selected similarity degrees as results of matching according to the space distribution system, to the determination circuit 4. The processing is then ended.

According to matching based on the space distribution system as described above, the similarity at which the distribution state of inputted integrated parameters and the distribution state of integrated parameters of a word as a recognition target are similar to each other in the integrated parameter space is obtained by a chi-square test, so the similarity is not influenced by time-based changes of an inputted speech. That is, the time of an inputted speech (e.g., the length of a speech segment) influences the observation degree used for the chi-square test, but chi-square test results are not influenced since each observation degree of each code is estimated to increase or decrease by a value proportional to the length of the speech segment. Accordingly, it is possible to perform recognition without considering time components which the speech has, and as a result, the recognition rate can be improved.

Figure 20:
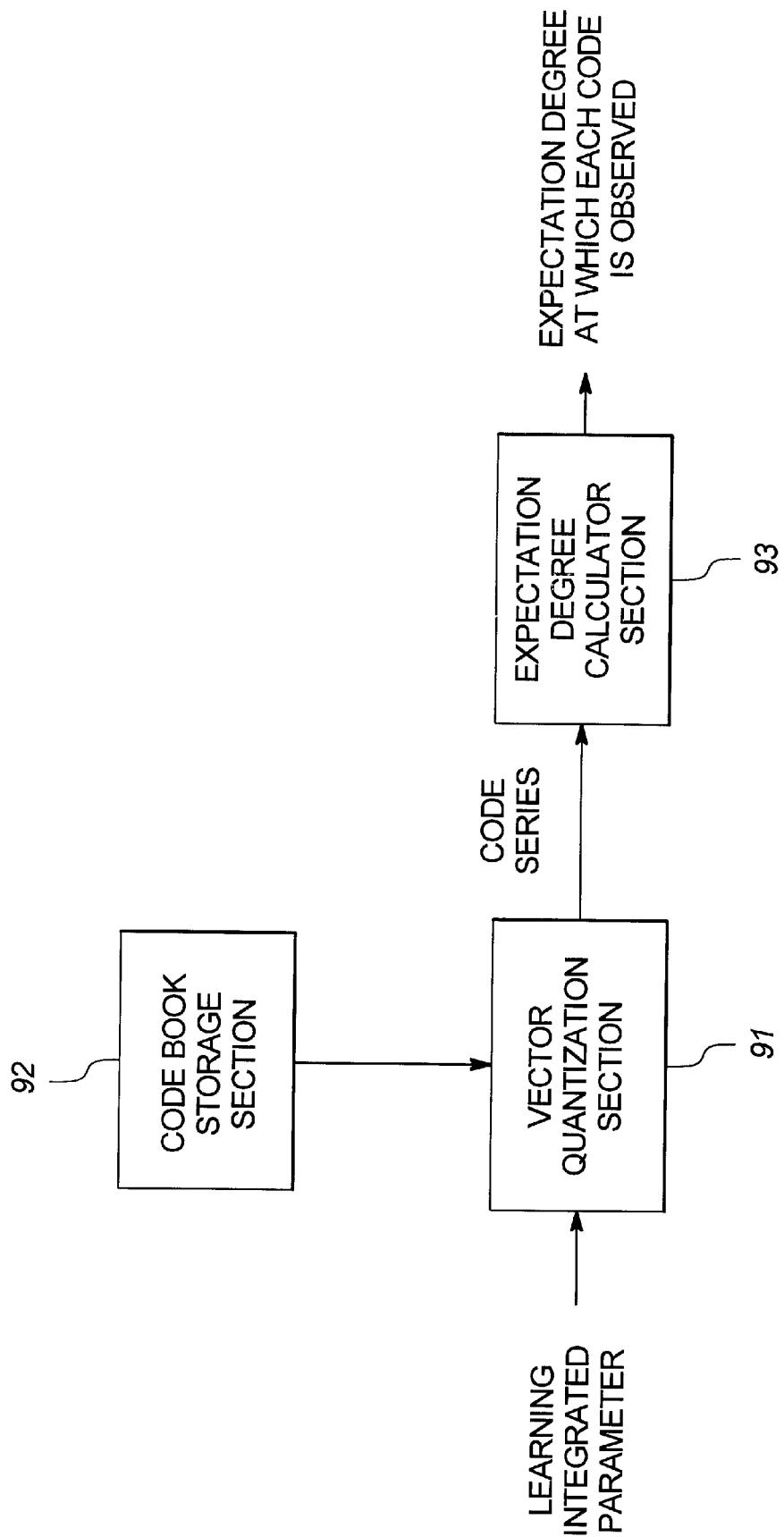
FIG. 20 is a block diagram showing a structural example of an embodiment of a learning apparatus which performs learning for obtaining an expectation degree stored in the expectation degree storage section shown in FIG. 18.

Next, FIG. 20 shows a structural example of an embodiment of a learning apparatus which performs learning for obtaining an expectation degree of each code with respect to each word as a recognition target, stored in the expectation degree storage section 84 shown in FIG. 18. A vector quantization section 91 is supplied with learning integrated parameters in time series for performing learning of expectation degrees, with respect to a word as a recognition target. The vector quantization section 91 vector-quantizes learning integrated parameters in time series, with use of a code book stored in a code book storage section 92, and supplies a series of codes as results of the vector quantization, to an expectation degree calculator section 93.

The code book storage section 92 stores the same code book as that stored in the code book storage section 82 shown in FIG. 18. Note that the code books in the code book storage sections 82 and 92 may be the same as that prepared by the code book preparation section 52 (FIG. 8) or may be different therefrom.

The expectation degree calculator section 93 counts the number of times for which each code is observed among the code series from the vector quantization section 91.

Figure 21:
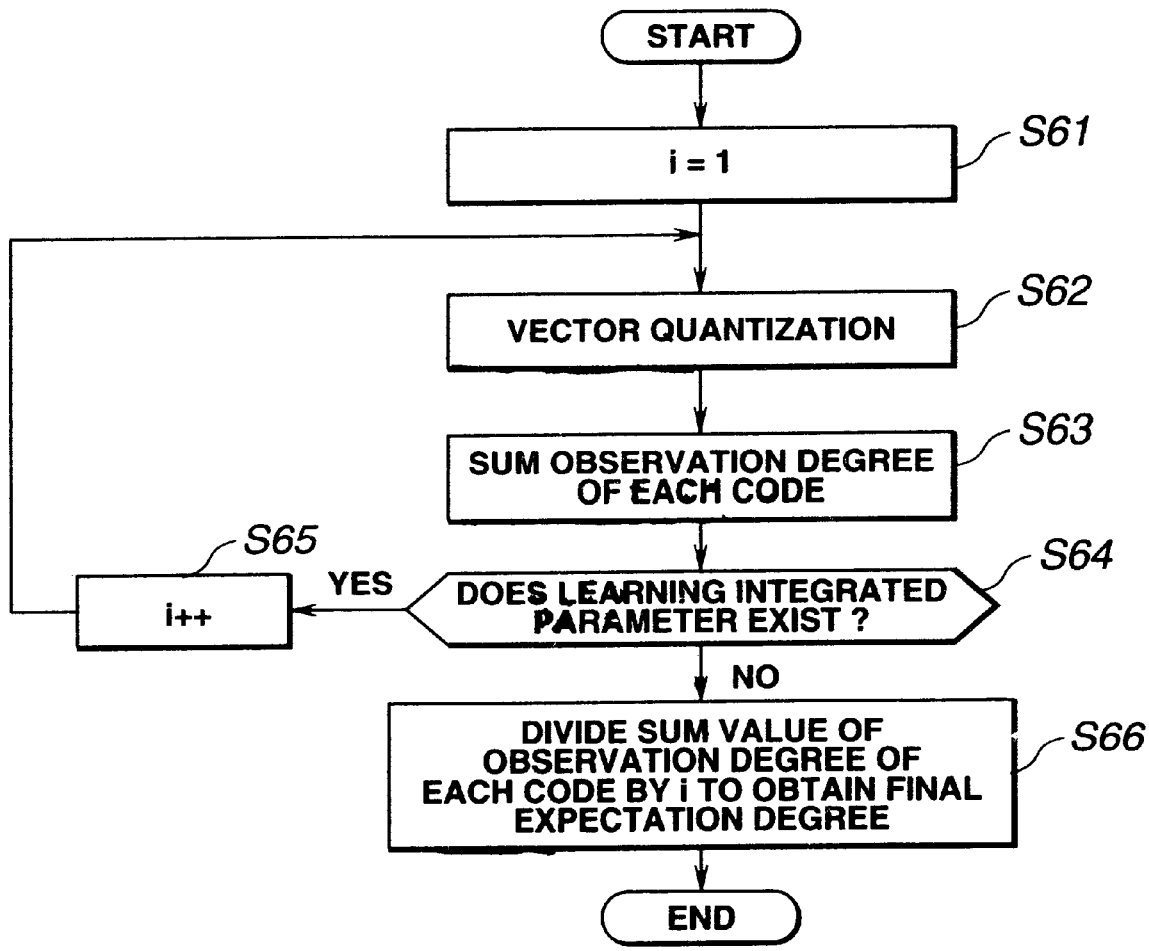
FIG. 21 is a flowchart for explaining processing in the learning apparatus shown in FIG. 20.

Next, with reference to the flow chart shown in FIG. 21, explanation will be made of the processing in the learning apparatus shown in FIG. 20. The vector quantization section 91 is supplied with, for example, a plurality of learning integrated parameters in time series, with respect to one word as a recognition target (e.g. obtained from speeches of different speakers or a plurality of speeches from one same speaker). In a step S61, a variable i for counting the number of integrated parameters is initialized to 1, for example, and the processing goes then to a step S62.

In the step S62, the first learning integrated parameter among the plurality of learning integrated parameters is supplied to the vector quantization section 91, and the vector quantization section 91 vector-quantizes the learning integrated parameter. A series of codes obtained as results of the vector quantization is supplied to the expectation degree calculator section 93, and the program goes to a step S63.

In the step S63, the number of times for which each code is observed among the series of codes from the vector quantization section 91 is summed, and the observation degree is thereby obtained. Further, the processing goes to a step S64, and whether or not there still is a leaning integrated parameter to be processed next is determined. If yes, the processing goes to a step S65 and the variable is incremented by 1. Further, the processing goes to the step S62 and the same processing as described above is repeated. That is, the observation degree of each code observed from a plurality of learning integrated parameters with respect to a word is summed in this manner.

Otherwise, if it is determined in the step S64 that there is not a learning integrated parameter to be processed next, the processing goes to a step S66. The summed value of the observation degrees of each code is divided by the variable i, That is, an average value of the observation degrees of each code observed from a plurality of learning integrated parameters is obtained, and the average value of the observation degrees of each code with respect to a word is outputted as an expectation degree of each code with respect to the word. The processing is then ended. Note that the processing shown in FIG. 21 is carried out for each of words as recognition targets.

Figure 4:
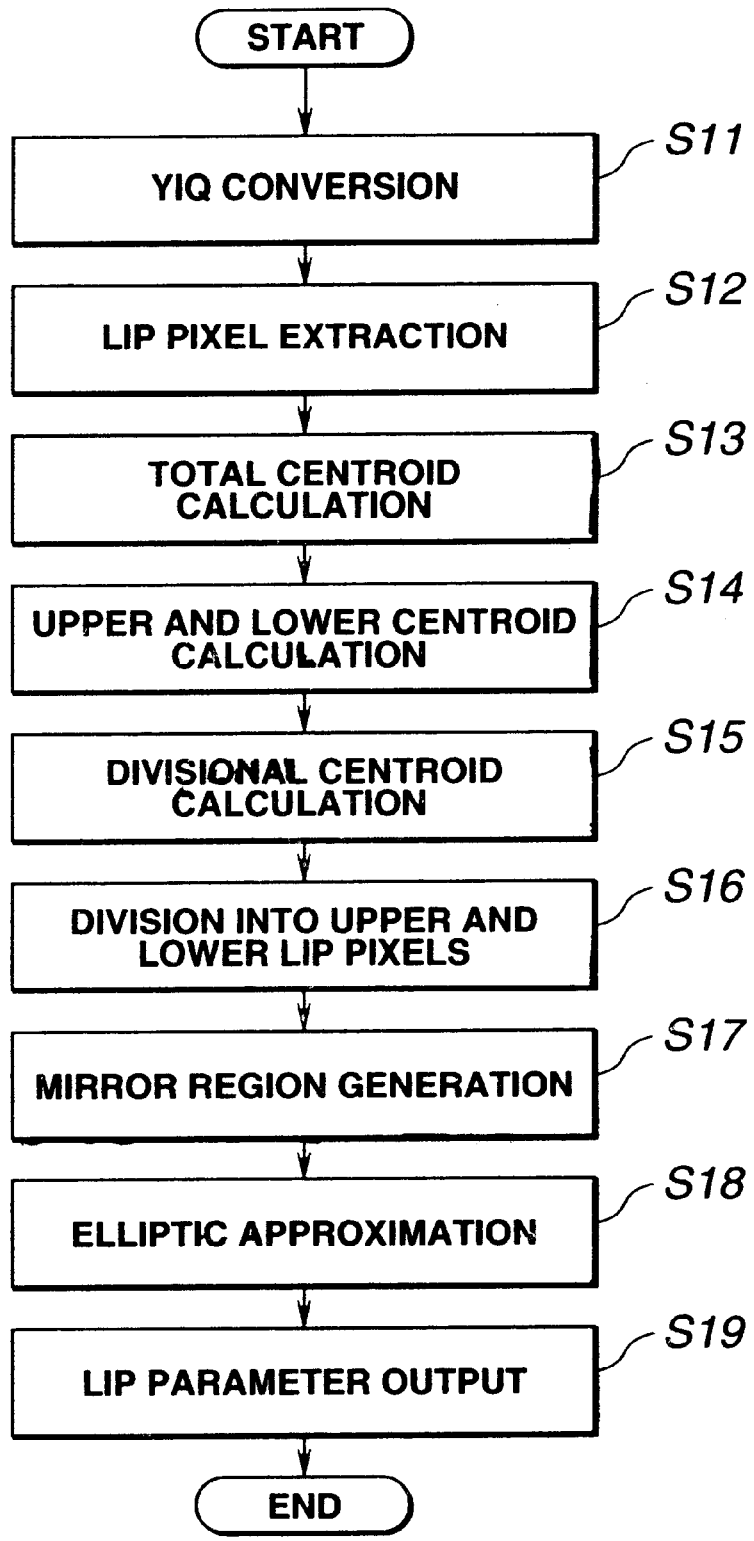
FIG. 4 is a flowchart for explaining processing in the signal processing section 11 shown in FIG. 1.
Figure 22:
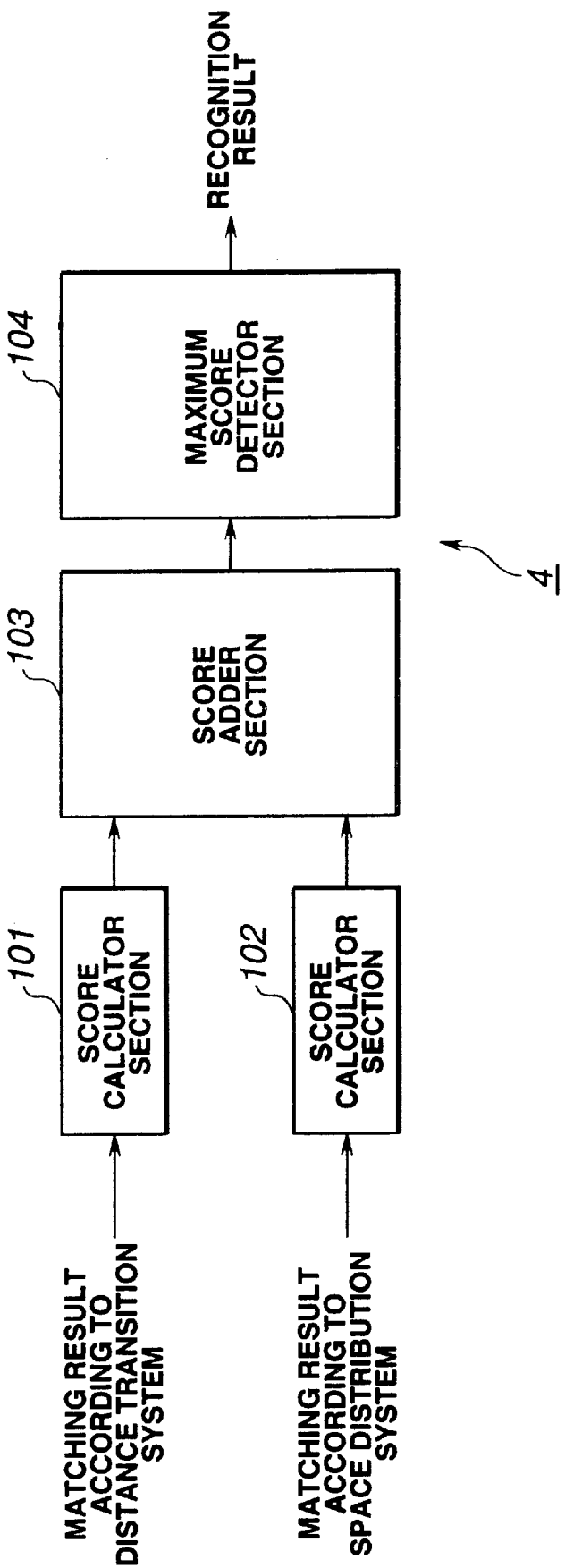
FIG. 22 is a block diagram showing a structural example of a determination circuit 4 shown in FIG. 1.

Next, FIG. 22 shows a structural example of the determination circuit 4 shown in FIG. 4. A score calculator section 101 is supplied with upper Nb matching results according to the distance transition system, outputted from a distance transition type matching section 31. A score calculator section 102 is supplied with upper Nb matching results according to the space distribution system, outputted from a space distribution type matching section 32. The score calculator section 101 adds higher scores to upper Nb matching results according to the distance transition system, in the order from the uppermost matching result, and outputs the results to a score adder section 103. The score calculator section 102 adds higher scores to the upper Nb matching results according to the space distribution system, in the order from the uppermost matching result, and outputs the results to the score adder section 103.

The score adder section 103 adds the scores of the matching results of one same word to each other, among the upper Nb matching results from each of the score calculator sections 101 and 102, and outputs an addition value thereof to a maximum score detector section 104.

The maximum score detector section 104 detects a maximum value among the scores supplied from the score adder section 103, and outputs a word which provides the maximum score, as a final speech recognition result.

Figure 23:
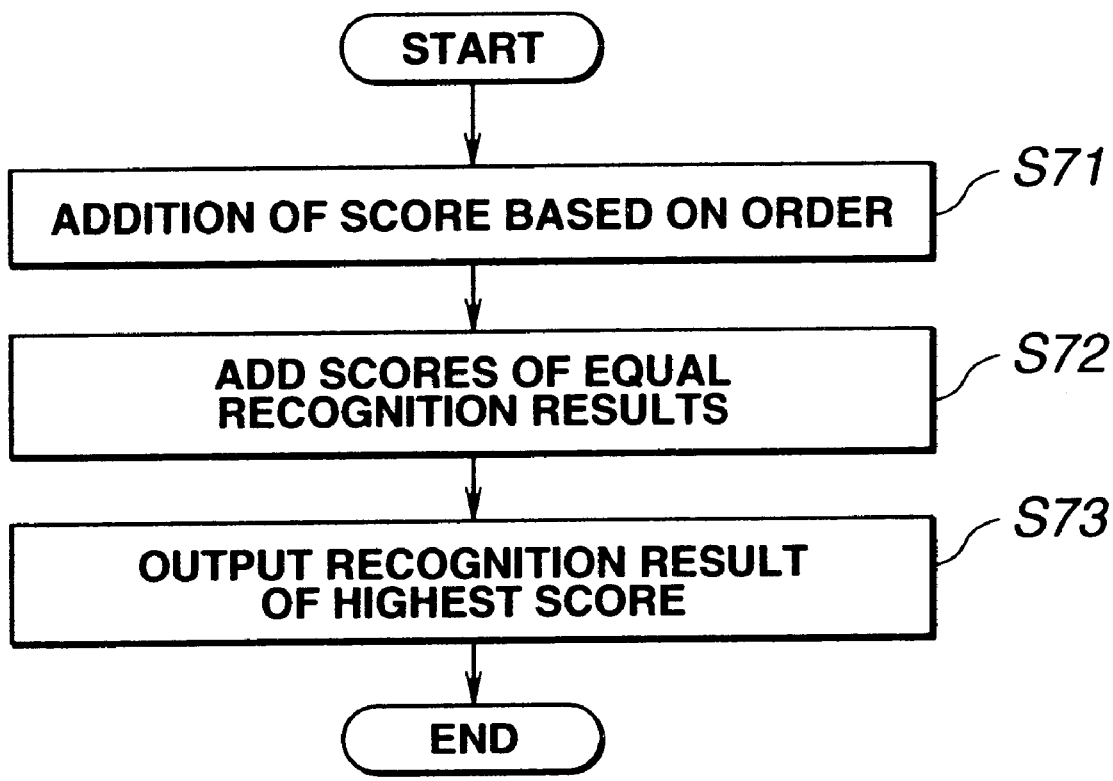
FIG. 23 is a flowchart for explaining processing in the determination circuit 4 shown in FIG. 22.

Next, with reference to the flowchart shown in FIG. 23, explanation will be made of the determination circuit 4 shown in FIG. 22. Upper Nb matching results according to the distance transition system are supplied from the distance transition type matching section 31 to the score calculator section 101, and upper Nb matching results according to the space distribution system are supplied from the space distribution type matching section 32 to the score calculator section 102. Then, in a step S71, the score calculator section 101 adds higher scores to the upper Nb matching results according to the distance transition system, in the order from the uppermost matching result, and outputs the results to the score adder section 103, as well as the score calculator section 102 adds higher scores to the upper Nb matching results according to the space distribution system, in the order from the uppermost matching result, and outputs the results to the score adder section 103.

Here, the score added to the matching result may be a value which changes linearly or nonlinearly in accordance with the order of the matching results.

In a step S72, the score adder section 103 adds the scores of the matching results of one same word to each other, among the upper Nb matching results from each of the score calculator sections 101 and 102, and outputs an addition value thereof to a maximum score detector section 104. With respect to a word which is included only in either the upper Nb matching results of the score calculator section 101 or 102, the score adder section 103 outputs directly the score added to the word to the maximum score detector section 104.

In a step S73, the maximum score detector section 104 detects a maximum value among the scores supplied from the score adder section 103, and outputs a word which provides the maximum score, as a final speech recognition result. The processing is then ended.

Next, the apparatus which performs the series of processing described above and is expressed by each block diagram can be realized by specialized hardware or by software. In case of realizing the apparatus by software (in this case, each block diagram can be said to be a diagram expressing a functional block), the program which constructs the software is installed in a general-purpose computer or the like.

Figure 24:
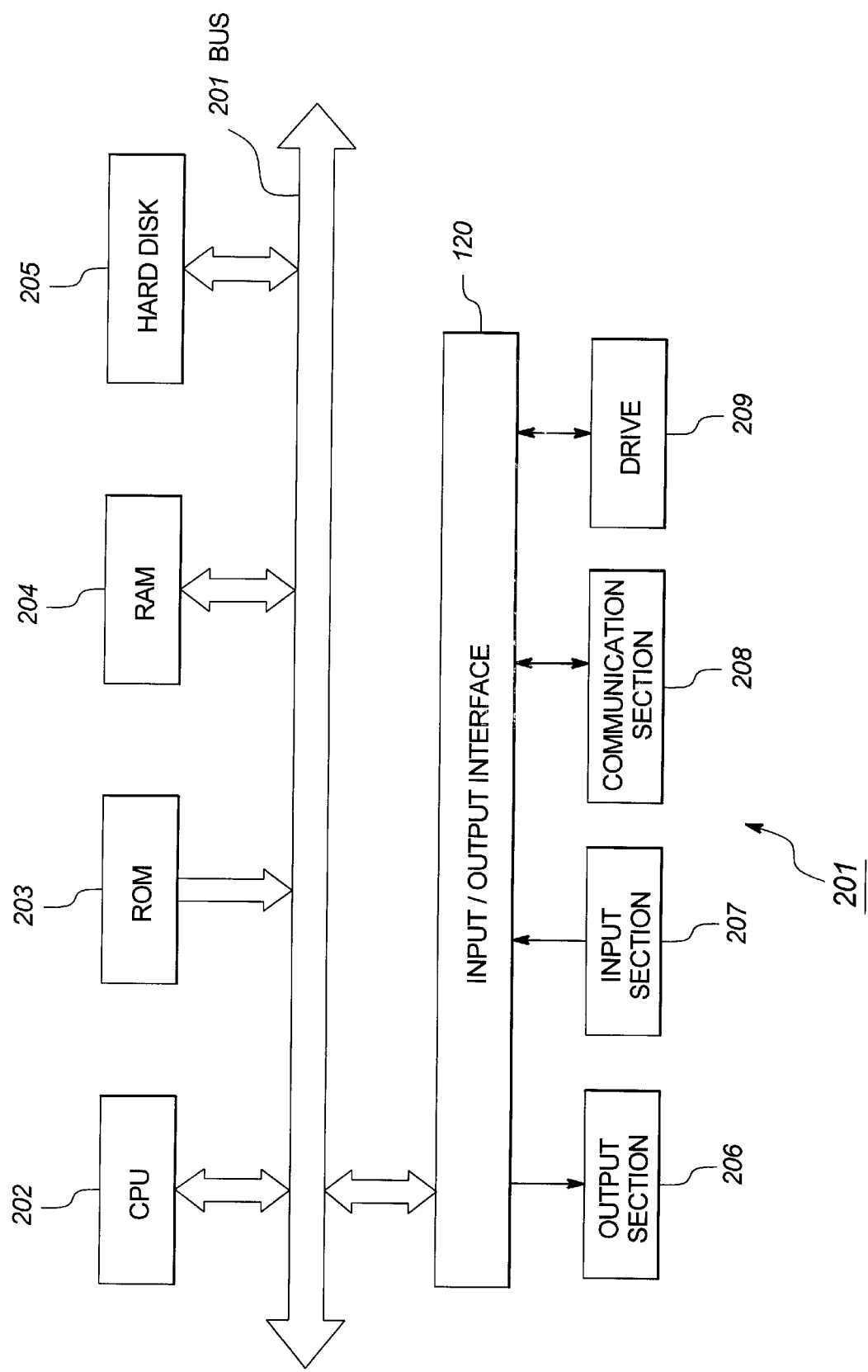
FIG. 24 is a block diagram showing a structural example of an embodiment of a computer to which the present invention is applied.

FIG. 24 hence shows a structural example of an embodiment of a computer in which the program for executing the series of processing described above is installed. The program can be recorded previously in a hard disk 205 or ROM 203 as a recording medium included in a computer.

Otherwise, the program can be temporarily or eternally stored (recorded) in a removable recording medium (not shown) such as a floppy disk, CD-ROM (Compact Disc Read Only Memory), MO (Magneto Optical) disk, DVD (Digital Versatile Disc), magnetic disk, or semiconductor memory. This removable recording medium can be provided as a so-called software package.

In addition to installation of the program into a computer from a removable recording medium as described above, the program can be transmitted to a computer via radio waves through an artificial satellite from a download site or via cables through a network such as a LAN (Local Area Network) or Internet. The computer can receive the transmitted program by a communication section 208 and install the program into an internal hard disk 205.

The computer includes a CPU (Central Processing Unit) 202. The CPU 202 is connected with an input/output interface 120 through a bus 201. When an input section 207 comprised of a keyboard, mouse, and the like is operated by a user and a command is inputted through the input/output interface 120, the CPU 202 executes a program stored in the ROM (Read Only Memory) 203 in accordance with the command. Otherwise, the CPU 202 loads a program stored in the hard disk 205, a program transmitted through a satellite or a network, received by the communication section 208, and installed into the hard disk 205, or a program read from the removable recording medium attached to a drive 209 into the hard disk 205, into a RAM (Random Access Memory) 204, and executes the program. In this manner, the CPU 202 executes various processing in accordance with the flowcharts described previously. Further, upon requirements, the CPU 202 outputs the processing results to an output section 206 composed of a LCD (Liquid Crystal Display), a speaker, and the like, transmits the processing results through the communication section 208, or record the processing results onto the hard disk 205.

In the present specification, processing steps of describing a program for causing the computer to execute various processing need not always be processed in time series along the order described in the flowcharts but include processing executed in parallel or individually (e.g., parallel processing or object-oriented processing).

Also, the program may be processed by one single computer or may be subjected to distributed processing by a plurality of computers. Further, the program may be transferred to a remote computer and executed therein.

In the above, explanation has been made with respect to a speech recognition apparatus to which the present invention is applied. The present invention is also applicable to a different apparatus, such as an apparatus which recognizes a speaker, an image, and the like.

Industrial Applicability

According to a learning apparatus, a learning method, and a recording medium of the present invention, an expectation degree of each identifier is calculated from a series of identifiers obtained from learning data in time series. Accordingly, by using the expectation degree, recognition can be carried out without considering time components which signals include.

According to a recognition apparatus, a recognition method, and a recording medium of the present invention, input data is vector-quantized so that a series of identifiers indicating code vectors is inputted. Properness as to whether or not the input data corresponds to a recognition target is obtained with use of a series of identifiers and expectation degrees of identifiers obtained from the input data. Further, based on the properness, whether or not the input data corresponds to the recognition target is recognized. Accordingly, recognition can be performed without considering time components which the input data include. As a result, the recognition rate can be improved.

According to a learning apparatus, a learning method, and a recording medium of the present invention, a distance between a standard series and a code vector is calculated, and a distance transition model expressing transition of the distance is outputted. Accordingly, a steady state and a transiting state of a recognition target can be expressed precisely.

According to a recognition apparatus, a recognition method, and a recording medium of the present invention, input data in time series is vector-quantized with use of a code book, and a series of identifiers corresponding to a code vector is outputted. Further, based on a distance transition model expressing transition of a distance between a standard series and a code vector and on a series of identifiers with respect to the input data, whether or not the input data corresponds to at least one recognition target is recognized. Accordingly, it is possible to improve the recognition rate.

According to a recognition apparatus, a recognition method, and a recording medium of the present invention, first and second input data pieces are integrated, and integrated data in time series is outputted. Further, based on transition of a distance obtained from a vector based on the integrated data in time series, whether or not the first or second data piece corresponds to at least one recognition target. Accordingly, it is possible to improve the recognition rate.

According to a learning apparatus, a learning method, and a recording medium of the present invention, each of a plurality of characteristic parameters is normalized, based on a normalization coefficient. With respect to each of the plurality of normalized characteristic parameters, the distance to a standard parameter is calculated. Further, the normalization coefficient is changed such that the distance with respect to an arbitrary one of the plurality of characteristic parameters is equal to the distance with respect to another arbitrary one. Accordingly, it is possible to obtain a normalization coefficient which can deal with each of the plurality of characteristic parameters by an equal weight.

According to a recognition apparatus, a recognition method, and a recording medium of the present invention, characteristic parameters of each of a plurality of input data pieces are normalized, and the plurality of normalized characteristic parameters are integrated into an integrated parameter. Further, based on the integrated parameters, whether or not one or more of the plurality of input data pieces correspond to a recognition target is determined. Accordingly, it is possible to prevent recognition from being strongly influenced by any a certain input data piece.

Although the present invention has been described with reference to specific embodiments, those of skill in the art will recognize that changes may be made thereto without departing from the spirit and scope of the invention as set forth in the hereafter appended claims.

What is claimed is:

1. A recognition apparatus for recognizing whether or not a time series of input data pieces corresponds to a recognition target, comprising:
    storage means for storing an expectation degree at which observation is expected when the time series of input data pieces is inputted, with respect to each of identifiers corresponding to code vectors used for vector quantization;
    vector quantization means for vector-quantizing the time series of input data pieces and for outputting a series of identifiers indicating code vectors;
    detection means for obtaining a measure of correctness as to whether or not the time series of input data pieces corresponds to the recognition target, with use of the series of identifiers obtained from the input data and the expectation degrees of the identifiers by making a chi-square test; and
    recognition means for recognizing whether or not the time series of input data pieces corresponds to the recognition target, based on the properness.

2. A recognition method for recognizing whether or not a time series of input data pieces corresponds to a recognition target, comprising the steps of:
    vector-quantizing the time series of input data pieces, thereby to output a series of identifiers indicating code vectors;
    obtaining a measure of correctness by making a chi-square test as to whether or not the time series of input data pieces corresponds to the recognition target, with use of the series of identifiers obtained from the input data pieces and expectation degrees of the identifiers at which the identifiers are expected to be observed; and
    recognizing whether or not the time series of input data pieces corresponds to the recognition target, based on the measure of correctness.

3. A recording medium which records a program for making a computer execute recognition processing for recognizing whether or not a time series of input data pieces corresponds to a recognition target, wherein the program comprises:
    a vector-quantization step of vector-quantizing the time series of input data pieces, thereby to output a series of identifiers indicating code vectors;
    a detection step of obtaining a measure of correctness by making a chi-square test as to whether or not the time series of input data pieces corresponds to the recognition target, with use of the series of identifiers obtained from the input data pieces and expectation degrees of the identifiers at which the identifiers are expected to be observed; and
    a recognition step of recognizing whether or not the time series of input data pieces corresponds to the recognition target, based on the a measure of correctness.

4. A recognition apparatus comprising:
    detection means for detecting a characteristic parameter with respect to each of a plurality of input data pieces;
    normalization means for normalizing the characteristic parameter of each of the plurality of input data pieces;
    integration means for integrating a plurality of normalized characteristic parameters into an integrated parameter; and
    recognition means for recognizing whether or not one or more of the plurality of input data pieces correspond to a recognition target, based on the integrated parameter wherein the normalization means normalizes the characteristic parameter, based on a normalization coefficient which is obtained by normalizing code book generation data for generating a code book used for vector quantization, based on the normalization coefficient by generating the code book with use of the normalized code book generation data, by using one of code vectors in the code book that is closest to the characteristic parameter as the standard parameter, thereby to calculate a distance to the characteristic parameter and by changing the normalization coefficient such that a distance with respect to an arbitrary one of the plurality of characteristic parameters and a distance with respect to another arbitrary one of the plurality of characteristic parameters are equal to each other.

5. The apparatus according to claim 4, wherein the normalization coefficient is obtained by normalizing each of a plurality of characteristic parameters, based on the normalization coefficient, by calculating a distance to a standard parameter, with respect to each of the plurality of characteristic parameters normalized, and by changing the normalization coefficient such that a distance with respect to an arbitrary one of the plurality of characteristic parameters and a distance with respect to another arbitrary one of the plurality of characteristic parameters are equal to each other.

6. A recognition method comprising:
    outputting a characteristic parameter with respect to each of a plurality of input data pieces comprising image data and noise data;
    normalizing the characteristic parameter of each of the plurality of input data pieces based on a normalization coefficient which is obtained by normalizing code book generation data for generating a code book used for vector quantization, based on the normalization coefficient by generating the code book with use of the normalized code book generation data, by using one of code vectors in the code book that is closest to the characteristic parameter as the standard parameter, thereby to calculate a distance to the characteristic parameter and by changing the normalization coefficient such that a distance with respect to an arbitrary one of the plurality of characteristic parameters and a distance with respect to another arbitrary one of the plurality of characteristic parameters are equal to each other;

integrating a plurality of normalized characteristic parameters into an integrated parameter; and recognizing whether or not one or more of the plurality of input data pieces correspond to a recognition target, based on the integrated parameter.

7. A recording medium which records a program to be executed by a computer, the program comprising:

a detection step of detecting a characteristic parameter with respect to each of a plurality of input data pieces comprising image data and noise data;

a normalization step of normalizing the characteristic parameter of each of the plurality of input data pieces based on a normalization coefficient which is obtained by normalizing code book generation data for generating a code book used for vector quantization, based on the normalization coefficient by generating the code book with use of the normalized code book generation data, by using one of code vectors in the code book that is closest to the characteristic parameter as the standard parameter, thereby to calculate a distance to the characteristic parameter and by changing the normalization coefficient such that a distance with respect to an arbitrary one of the plurality of characteristic parameters and a distance with respect to another arbitrary one of the plurality of characteristic parameters are equal to each other;

an integration step of integrating a plurality of normalized characteristic parameters into an integrated parameter; and a recognition step of recognizing whether or not one or more of the plurality of input data pieces correspond to a recognition target, based on the integrated parameter.

\* \* \* \* \*